(12) United States Patent
Sabi et al.

(10) Patent No.: US 7,924,694 B2
(45) Date of Patent: Apr. 12, 2011

(54) WRITE-ONCE TYPE OPTICAL RECORDING MEDIUM AND FABRICATION METHOD THEREOF

(75) Inventors: Yuichi Sabi, Tokyo (JP); Etsuro Ikeda, Miyagi (JP); Fuminori Takase, Miyagi (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 11/814,056

(22) PCT Filed: Nov. 16, 2006

(86) PCT No.: PCT/JP2006/323372
§ 371 (c)(1),
(2), (4) Date: Dec. 10, 2008

(87) PCT Pub. No.: WO2007/061021
PCT Pub. Date: May 31, 2007

(65) Prior Publication Data
US 2009/0097387 A1    Apr. 16, 2009

(30) Foreign Application Priority Data
Nov. 22, 2005  (JP) ................................. 2005-337813

(51) Int. Cl.
G11B 7/24       (2006.01)
B32B 3/02       (2006.01)

(52) U.S. Cl. ..................... 369/275.3; 369/288; 428/64.1; 428/64.4

(58) Field of Classification Search ............... 369/275.3, 369/288, 283, 275.1; 428/64.1, 64.4, 64.5; 430/270.12
See application file for complete search history.

(56) References Cited

U.S. PATENT DOCUMENTS

| | | | | |
|---|---|---|---|---|
| 7,427,431 B2* | 9/2008 | Sabi et al. | ..................... | 428/64.1 |
| 7,468,200 B2* | 12/2008 | Sabi et al. | ..................... | 428/64.1 |
| 2008/0233389 A1* | 9/2008 | Sakai et al. | ..................... | 428/336 |
| 2009/0130461 A1* | 5/2009 | Sabi et al. | ..................... | 428/447 |
| 2010/0047503 A1* | 2/2010 | Sakai et al. | ..................... | 428/64.4 |
| 2010/0233413 A1* | 9/2010 | Sakai et al. | ..................... | 428/64.4 |

FOREIGN PATENT DOCUMENTS

| | | |
|---|---|---|
| EP | 1 701 349 | 9/2006 |
| JP | 64-017234 | 1/1989 |
| JP | 11-144316 | 5/1999 |

(Continued)

OTHER PUBLICATIONS

International Search Report Dated Apr. 2, 2009.

(Continued)

*Primary Examiner* — Ali Neyzari
(74) *Attorney, Agent, or Firm* — SNR Denton US LLP

(57) ABSTRACT

To accomplish write-once type optical recording mediums that have excellent recording and reproducing characteristics and producibility and that are capable of being fabricated at low cost. A write-once type optical recording medium 10 has the structure of which an inorganic recording film 6, a dielectric film 4, and a light transmission layer 5 have been successively formed on a substrate 1. The inorganic recording film 6 is composed of a metal film 2 and an oxide film 3 successively formed on the substrate 1. When light is radiated to the inorganic recording film 6, oxygen is separated from the oxide film 3 due to the light catalyst effect, resulting in increasing the oxygen concentration on the metal film 2 side and largely varying the optical constant.

23 Claims, 35 Drawing Sheets

FOREIGN PATENT DOCUMENTS

| | | |
|---|---|---|
| JP | 2005-161831 | 6/2005 |
| JP | 2005-313474 | 11/2005 |
| JP | 2006-252677 | 9/2006 |
| JP | 2006-347082 | 12/2006 |
| WO | 00/06391 | 2/2000 |
| WO | 2005/078711 | 8/2005 |

OTHER PUBLICATIONS

International Search Report dated Feb. 27, 2007.
Japanese Patent Office Action corresponding to Japanese Serial No. 2005-337813 dated Oct. 27, 2009.

* cited by examiner

10 WRITE-ONCE TYPE OPTICAL RECORDING MEDIUM

5 PC SHEET / PSA: 0.1 mm (LIGHT TRANSMISSION LAYER)
4 SiN FILM: 60 nm (DIELECTRIC FILM)
3 GeO FILM: 20 nm (OXIDE FILM)
7 SiN FILM: 5 nm (DIELECTRIC FILM)
2 Ti FILM: 30 nm (METAL FILM)
1 SUBSTRATE: 1.1 mm

10 WRITE-ONCE TYPE OPTICAL RECORDING MEDIUM

5 PC SHEET / PSA: 0.1 mm (LIGHT TRANSMISSION LAYER)
4 SiN FILM: 20 nm (DIELECTRIC FILM)
3 GeO FILM: 20 nm (OXIDE FILM)
2 Al FILM: 30 nm (METAL FILM)
1 SUBSTRATE: 1.1 mm

10 WRITE-ONCE TYPE OPTICAL RECORDING MEDIUM

- 5 PC SHEET / PSA: 0.1 mm (LIGHT TRANSMISSION LAYER)
- 4 SiN FILM: 20 nm (DIELECTRIC FILM)
- 3 GeO FILM: 20 nm (OXIDE FILM)
- 2 AlGd FILM: 30 nm (METAL FILM)
- 1 SUBSTRATE: 1.1 mm

10 WRITE-ONCE TYPE OPTICAL RECORDING MEDIUM

5 PC SHEET / PSA: 0.1 mm (LIGHT TRANSMISSION LAYER)
4b SiN FILM: 10 nm (SECOND DIELECTRIC FILM)
4a ZnS-SiO$_2$ FILM: 45 nm (FIRST DIELECTRIC FILM)
3 GeO FILM: 22 nm (OXIDE FILM)
2 TiSi$_y$O$_z$ FILM: 25 nm (METAL FILM)
1 SUBSTRATE: 1.1 mm

Fig. 14

| FILM THICKNESS OF FIRST DIELECTRIC FILM [T1] | FILM THICKNESS OF SECOND DIELECTRIC FILM [T2] | Leading Jitter | Trailing Jitter |
|---|---|---|---|
| 43nm | 0nm | 5.0% | 5.6% |
| 38nm | 10nm | 4.8% | 5.6% |
| 33nm | 15nm | 5.0% | 5.6% |
| 28nm | 20nm | 5.1% | 6.0% |
| 23nm | 28nm | 5.7% | 5.9% |
| 10nm | 35nm | 6.5% | 6.5% |
| 0nm | 60nm | 7.0% | 7.0% |

10 WRITE-ONCE TYPE OPTICAL RECORDING MEDIUM

5 PC SHEET / PSA: 0.1 mm (LIGHT TRANSMISSION LAYER)

4b SiN FILM: 60 nm (SECOND DIELECTRIC FILM)

3 GeO FILM: 20 nm (OXIDE FILM)

2 TiSiyOz FILM: 30 nm (METAL FILM)

1 SUBSTRATE: 1.1 mm

Fig. 20

| FILM THICKNESS OF TiS FILM | FILM THICKNESS OF GeO FILM | Leading Jitter | Trailing Jitter |
|---|---|---|---|
| 25nm | 16nm | 5.5% | 6.1% |
| 22nm | 18nm | 5.3% | 5.3% |
| 20nm | 20nm | 5.3% | 5.6% |
| 27nm | 22.5nm | 4.8% | 4.9% |

Fig. 28

| | LASER INCIDENT DIRECTION | LASER POWER [mW] | SCAN SPEED [m/s] | EVALUATION RESULT |
|---|---|---|---|---|
| EXAMPLE 17 | SUBSTRATE SIDE | 4000 | 3 | × |
| EXAMPLE 18 | | | 5 | ○ |
| EXAMPLE 19 | | | 7 | ○ |
| EXAMPLE 20 | | | 9 | ○ |
| EXAMPLE 21 | | | 11 | × |

Fig. 29

|  | LASER INCIDENT DIRECTION | LASER POWER [mW] | SCAN SPEED [m/s] | EVALUATION RESULT |
|---|---|---|---|---|
| EXAMPLE 22 | SUBSTRATE SIDE | 3400 | 3 | × |
| EXAMPLE 23 | | | 5 | ○ |
| EXAMPLE 24 | | | 7 | ○ |
| EXAMPLE 25 | | | 9 | ○ |
| EXAMPLE 26 | | | 11 | × |

*Fig. 30*

|  | LASER INCIDENT DIRECTION | LASER POWER [mW] | SCAN SPEED [m/s] | EVALUATION RESULT |
|---|---|---|---|---|
| EXAMPLE 27 | LIGHT TRANSMISSION LAYER SIDE | 4000 | 3 | × |
| EXAMPLE 28 | | | 5 | × |
| EXAMPLE 29 | | | 7 | × |
| EXAMPLE 30 | | | 9 | × |
| EXAMPLE 31 | | | 11 | × |

*Fig. 31*

|  | LASER INCIDENT DIRECTION | LASER POWER [mW] | SCAN SPEED [m/s] | EVALUATION RESULT |
|---|---|---|---|---|
| EXAMPLE 32 | LIGHT TRANSMISSION LAYER SIDE | 3400 | 3 | × |
| EXAMPLE 33 | | | 5 | × |
| EXAMPLE 34 | | | 7 | × |
| EXAMPLE 35 | | | 9 | × |
| EXAMPLE 36 | | | 11 | × | ered to as BD) that has been commercialized as a next
WRITE-ONCE TYPE OPTICAL RECORDING MEDIUM AND FABRICATION METHOD THEREOF

TECHNICAL FIELD

The present invention relates to a write-once type recording medium and a fabrication method thereof. In particular, the present invention relates to a write-once type recording medium having an inorganic recording film and a fabrication method thereof.

BACKGROUND ART

As widely known as for example CD-R (Compact Disc-Recordable) and DVD-R (Digital Versatile Disc-Recordable), write-once type recording mediums having a recording layer whose recording material is an organic dye have been widespread.

Various types of recording mediums using an inorganic recording material have been proposed (for example, Japanese Patent Application Laid-Open No. HEI 11-144316). However, to date, recording mediums using an organic material as a recording material (hereinafter, these recording mediums are referred to as organic recording mediums) have more widespread than recording mediums using an inorganic material as a recording material) (hereinafter, these recording mediums are referred to as inorganic recording mediums). This is because when an inorganic material is used as a recording film of a recording medium, since the flexibility of reflectance ratio is low, the resultant recording medium is not able to have compatibility with a ROM (Read Only Memory). In addition, when the recording characteristics and durability of a recording medium are tried to be improved, a multi-layer film needs to be used, resulting in increasing the facility cost for fabrication equipment for example a spattering unit. Thus, the fabrication cost for recording mediums using an inorganic material becomes higher than that using an organic material.

In contrast, in write-once type optical recording mediums using an organic material as a recording material, since their recording layer can be formed by the spin coat method and a reflection film is formed on the recording layer, the fabrication method is simple and the facility cost of the fabrication equipment is low.

On the other hand, a high density structure of optical discs have been accomplished mainly by using a short wavelength light source and a small numerical aperture (N. A.) objective lens. To date, since blue semiconductor lasers having short wavelengths of around 400 nm have been practically used, there are needs of developing organic dyes suitable for light sources having such wavelengths.

However, in organic dyes that satisfy optical characteristics of light having short wavelengths, the sizes of color dye particles tend to become small. Thus, since the flexibility of molecule design becomes low, the flexibility of designing characteristics of resultant mediums becomes low.

In Blu-ray Disc ((registered trademark), hereinafter referred to as BD) that has been commercialized as a next generation optical disc standard, since its N. A. is 0.85, because the skew tolerance is small, recording and reproducing blue laser light is radiated from a light transmission layer having a thickness of 0.1 mm and formed on the recording layer. When an organic dye is used as a recording material, a dielectric film needs to be formed to prevent molecules of the organic pigment from dispersing in the light transmission layer. In these situations, there is a need for a low cost recording film substituted for an organic dye.

For optical systems for CD-R and DVD-R, an inorganic recording medium may be superior to an organic recording medium in recording and reproducing characteristics. However, in an optical recording medium whose recording layer is formed by the spatter method and that has many structural layers as in a phase change type recording medium, its fabrication process will become complicated and the cost will rise. Thus, it is desired that the number of structural layers of a write-once type recording medium be at most 3 to 4.

DISCLOSURE OF THE INVENTION

Thus, an object of the present invention is to provide a write-once type optical recording medium that has an inorganic recording film, that is excellent in recording and reproducing characteristics and productivity, and that is capable of being fabricated at low cost.

To solve the foregoing problem, a first aspect of the present invention is a write-once type optical recording medium having an inorganic recording film, wherein the inorganic recording film has:
an oxide film made of an oxide of Ge; and
an adjacent film disposed in contact with the oxide film and made of a metal material, and
wherein an absorption coefficient k of the oxide film is in a range from $0.15 \leqq k \leqq 0.90$.

A second aspect of the present invention is a method of fabricating a write-once type optical recording medium having an inorganic recording film, the method comprising the steps of:
forming an adjacent film made of Ti; and
forming an oxide film made of an oxide of Ge,
wherein the oxide film forming step and the adjacent film forming step are preformed such that the oxide film and the adjacent film are adjacent to each other, and
wherein an absorption coefficient k of the oxide film is in a range from $0.15 \leqq k \leqq 0.90$.

In the first and second aspects of the present invention, it is preferred that the oxide film have a film thickness ranging from 10 nm to 35 nm. In the first and second aspects of the present invention, it is preferred that the adjacent film have been oxidized and a composition of oxygen of the adjacent film be in a range from 9 atomic % to 38 atomic %. It is preferred that the adjacent film be made of Ti. It is preferred that the adjacent film be made of a TiSi alloy containing Si. It is preferred that a composition of Si of the TiSi alloy be in a range from 8 atomic % to 32 atomic %. It is preferred that the adjacent film be made of Al. It is preferred that the adjacent film be an alloy film made of Al and at least one of Tb, Gd, Dy, and Nd of rare earth metals.

In the first and second aspects of the present invention, it is preferred that a dielectric film be disposed on the oxide film such that the dielectric film and the adjacent film sandwich the oxide film. It is preferred that the dielectric film be made of SiN. It is preferred that the dielectric film be made of ZnS—SiO$_2$. It is preferred that the dielectric film have a first dielectric film disposed adjacent to the oxide film and a second dielectric film formed on the first dielectric film and that the first dielectric film be made of ZnS—SiO$_2$ and the second dielectric film be made of SiN. It is preferred that the dielectric film have a film thickness ranging from 10 nm to 100 nm.

In the first and second aspects of the present invention, it is preferred that typically at least the oxide film and the adjacent film be formed on a substrate having an uneven surface of lands and grooves.

In the first and second aspects of the present invention, it is preferred that guide grooves be formed on a substrate at a track pitch ranging from 0.29 μm to 0.35 μm and the grooves have a depth ranging from 18 nm to 21.5 nm. In this case, it is preferred that a relationship of $-0.01<2\ (R_{ON}-R_{IN})/(R_{ON}+R_{IN})$ is satisfied, where $R_{ON}$ is a return light amount from a recording/reproducing groove surface detected by a reproduction optical system and $R_{IN}$ is a return light amount from another groove surface detected by the reproduction optical system. It is preferred that a wobble amplitude is in a range from 9 nm to 13 nm.

In the first aspect of the present invention, it is preferred that an identification information recording area in which identification information has been recorded be disposed. It is preferred that the identification information be recorded by forming a recording mark corresponding to the identification information on the oxide film. Alternatively, it is preferred that the identification information be recorded by removing the inorganic recording film in a pattern corresponding to the identification information.

In the second aspect of the present invention, it is preferred to further include the step of recording identification information by radiating laser light having a wavelength ranging from 350 nm to 450 nm through the oxide film side to the write-once type optical recording medium. Alternatively, it is preferred to further include the step of recording identification information by radiating laser light through the adjacent film side to the write-once type optical recording medium. It is preferred that the laser light be radiated to the write-once type optical recording medium in conditions of which an optical head scan speed is in a range from 5 m/s to 9 m/s and a laser power is in a range from 3400 mW to 4000 mW.

In the first and second aspects of the present invention, since an inorganic recoding film is composed of an oxide film made of an oxide of germanium and an adjacent film adjacent to the oxide film, when light is radiated to the inorganic recording film, oxygen is separated from the oxygen film due to the light catalyst effect of the adjacent film such that the amount of oxygen on the adjacent film side is larger than on the other side. Thus, the oxygen film is separated into a high oxygen concentration layer and a low oxygen concentration layer and the optical constant of the oxygen film is largely varied. As a result, since a reproduction signal having a large modulation degree can be obtained, excellent recoding characteristics can be accomplished.

As described above, according to the present invention, recording and reproducing characteristics and producibility of a write-once type optical recording medium having an inorganic recording film can be improved and the fabrication cost can be reduced.

BRIEF DESCRIPTION OF DRAWINGS

FIG. 14 is a table listing measured results of leading jitters and trailing jitters of recording marks;

FIG. 20 is a table listing measured results of film thicknesses of an TiSiO film and a GeO film and jitter values;

FIG. 28 is a table listing evaluation results of reproduction signals from the BCAs according to examples 17 to 21;

FIG. 29 is a table listing evaluation results of reproduction signals from the BCAs according to examples 22 to 26;

FIG. 30 is a table listing evaluation results of reproduction signals from the BCAs according to examples 27 to 31;

FIG. 31 is a table listing evaluation results of reproduction signals from the BCAs according to examples 32 to 36;

BEST MODES FOR CARRYING OUT THE INVENTION

Figure 1:
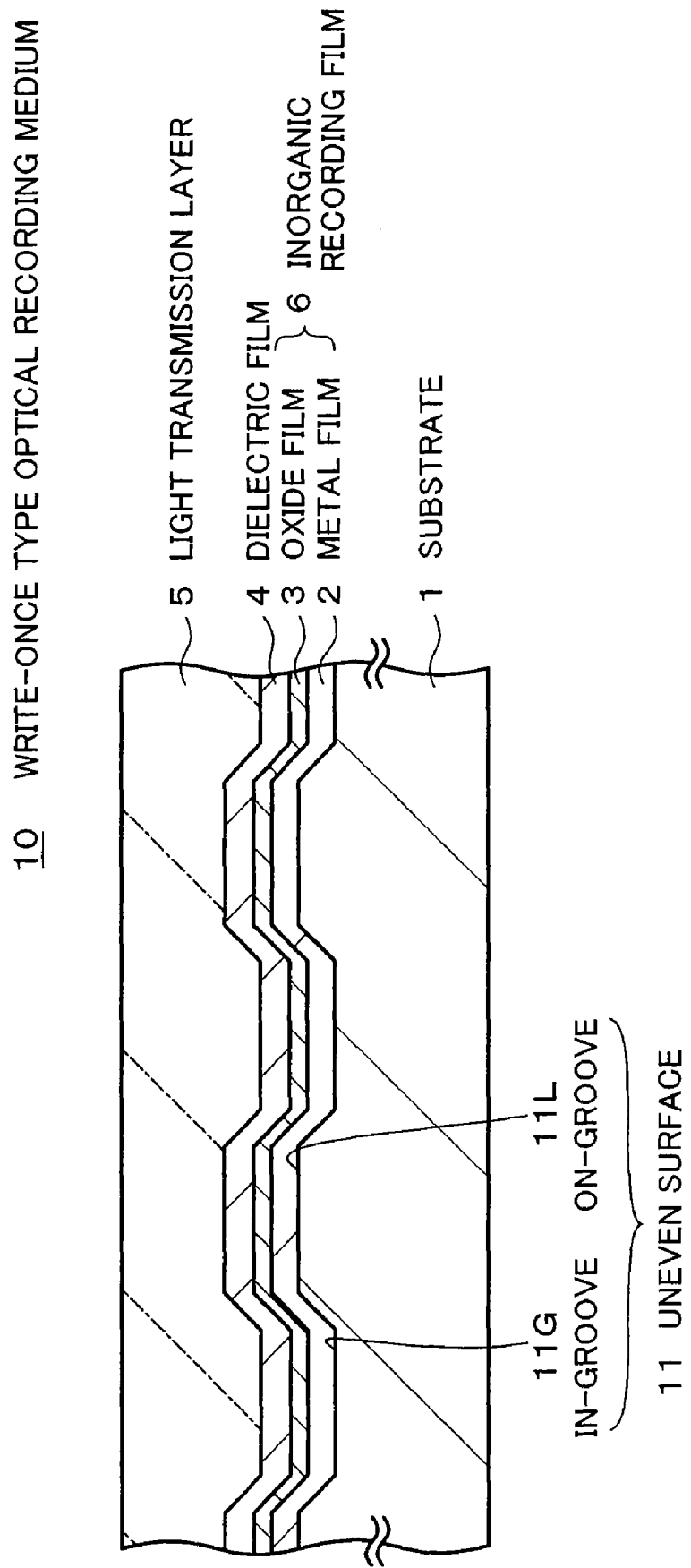
FIG. 1 is a schematic sectional view showing an example of the structure of a write-once type recording medium according to a first embodiment of the present invention.

Next, with reference to the accompanying drawings, embodiments of the present invention will be described. In all the drawings of the following embodiments, the same or corresponding portions will be denoted by the same reference numerals.

(1) First Embodiment

Structure of Write-once Type Optical Recording Medium

FIG. 1 is a schematic sectional view showing an example of the structure of a write-once type optical recording medium according to a first embodiment of the present invention. The write-once type optical recording medium represented by reference numeral 10 has a structure in which an inorganic recording film 6, a dielectric film 4, and a light transmission layer 5 have been successively formed on a substrate 1.

In the write-once type optical recording medium 10 according to the first embodiment, by radiating laser light from the light transmission layer 5 side to the inorganic recording film 2, an information signal is recorded and/or reproduced. For example, when laser light having a wavelength ranging from 400 nm to 410 nm is collected by an objective lens having a numerical aperture in the range from 0.84 to 0.86 and radiated from the light transmission layer 5 side to the inorganic recording film 2, an information signal is recorded and/or reproduced. An example of the write-once type optical recording medium 10 includes a write-once type BD.

Next, the substrate 1, the inorganic recording film 6, the dielectric film 4, and the light transmission layer 5, which compose the write-once type optical recording medium 10, will be described one by one.

(Substrate)

The substrate 1 has an annular shape with a center opening (hereinafter referred to as the center hole) 1a. One principal surface of the substrate 1 is an uneven surface 11. The inorganic recording film 6 is formed above the uneven surface 11. In the following description, hollowed concave portions of the principal surface of the substrate 1 are referred to as in-grooves 11G, whereas protruded convex portions of the principal surface of the substrate 1 are referred to as on-grooves 11L.

Examples of the shapes of the in-grooves 11G and the on-grooves 11L include a spiral shape and a concentric circular shape. The in-grooves 11G and/or the on-grooves 11L are wobbled such that address information is added.

The diameter of the substrate 1 is selected to be for example 120 mm. The thickness of the substrate 1 is selected taking into account of rigidity, preferably in the range from 0.3 mm to 1.3 mm, more preferably in the range from 0.6 mm to 1.3 mm, for example selected to be 1.1 mm. The radius of the center hole 1a is selected to be for example 15 mm.

Examples of the material of the substrate 1 include plastic materials, such as polycarbonate resins, polyolefin resins, and acrylic resins, and glass. Focusing on cost, it is preferred that the material of the substrate 1 be a plastic material.

(Inorganic Recording Film)

The inorganic recording film 6 is composed of a metal film 2 and an oxide film 3 successively formed on the uneven surface 11 of the substrate 1. The metal film 2 is made of Ti or a material containing Ti as a main component. The material containing Ti as a main component is a material made of Ti and an additive. With Ti as a main component, excellent recording characteristic can be basically obtained. An additive is used to improve optical characteristics, durability, and/or recording sensitivity. Examples of the additive include Al, Ag, Cu, Pd, Ge, Si, Sn, Ni, Fe, Mg, V, C, Ca, B, Cr, Nb, Zr, S, Se, Mn, Ga, Mo, W, Tb, Dy, Gd, Nd, Zn, Ta, and Sr. Specifically, it is preferred that an additive used to improve reflectance ratio be Al.

The oxide film 3 is made of for example Geo, which is an oxide of germanium. The absorption coefficient k of the oxide film 3 is preferably in the range from 0.15 to 0.90, more preferably in the range from 0.20 to 0.70, and further more preferably in the range from 0.25 to 0.60. The film thickness of the oxide film 3 is preferably in the range from 10 nm to 35 nm. When the absorption coefficient k of the oxide film 3 satisfies the range from 0.15 to 0.90, excellent modulation degree and carrier-to-noise ratio (hereinafter referred to as C/N ratio) can be obtained. When the absorption coefficient k of the oxide film 3 satisfies the range from 0.20 to 0.70, more excellent modulation degree and C/N ratio can be obtained. When the absorption coefficient k of the oxide film 3 satisfies the range from 0.25 to 0.60, further excellent modulation degree and C/N ratio can be obtained.

In this specification, the absorption coefficient of the oxide film 3 was measured based on laser light having a wavelength of 410 nm. In addition, the absorption coefficient was measured by an ellipsometer (Manufacturer: RUDOLPH technologies, Inc.; product name: Auto EL-462P17).

An additive may be added to the oxide film 3. Examples of the additive include Te, Pd, Pt, Cu, Zn, Au, Ag, Si, Ti, Fe, Ni, Sn, and Sb. When the additive is added, the durability and/or reactivity (recording sensitivity) can be improved. To improve the durability, it is preferred that Pd, Pt, Si, or Sb be used.

(Dielectric Film)

The dielectric film 4 is formed above the inorganic recording film 6 such that the dielectric film 4 optically and mechanically protects the inorganic recording film 6, namely improves the durability thereof, and suppresses the deformation, namely swelling, of the inorganic recording film 6 when recording is preformed. Examples of the material of the dielectric film 4 include SiN, ZnS—$SiO_2$, AlN, $Al_2O_3$, $SiO_2$, $TiO_2$, and SiC. The thickness of the dielectric film 4 is in the range from for example 10 nm to 100 nm.

(Light Transmission Layer)

The light transmission layer 5 is composed of for example an annular light transmission sheet (film) and an adhesive layer that adheres the light transmission sheet to the substrate 1. The adhesive layer is made of for example an ultraviolet setting resin or a pressure sensitive adhesive (PSA). The thickness of the light transmission layer 5 is preferably selected in the range from 10 μm to 177 μm, for example selected to be 100 μm. When the thin light transmission layer 5 and the objective lens having a large N. A. (numerical aperture) of for example around 0.85 are combined, high density recording can be accomplished.

It is preferred that the light transmission sheet be made of a material having a low absorption coefficient against laser light used for recording and/or reproducing. Specifically, it is preferred that the light transmission sheet be made of a material having a transmittance of 90% or more. Examples of the material of the light transmission sheet include polycarbonate resins and polyolefin resins (for example, ZEONEX (registered trademark)).

The thickness of the light transmission sheet is preferably selected to be 0.3 mm or less, further preferably selected in the range from 3 μm to 177 μm. The inner diameter of the light transmission layer 5 is selected to be for example 22.7 mm.

Method of Fabricating Write-once Type Optical Recording Medium

Next, a method of fabricating the write-once type optical recording medium according to the first embodiment of the present invention will be described.

(Substrate Molding Step)

First, the substrate 1 having an uneven surface formed on one principal surface thereof is molded. Examples of the method of molding the substrate 1 include injection molding method and photo polymerization (2P) method.

(Metal Film Forming Step)

Next, the substrate 1 is conveyed to a vacuum chamber containing target made of for example Ti or a metal material containing Ti as a main component. The vacuum chamber is vacuumed until the inner pressure becomes a predetermined value. Thereafter, while a process gas is being supplied to the vacuum chamber, the target is spattered such that the metal film 2 is formed on the substrate 1.

The film forming conditions in this film forming step are, for example, as follows.

Achieved degree of vacuum: $5.0 \times 10^{-5}$ Pa
Atmosphere: 0.1 to 0.6 Pa
Input power: 1 to 3 kW
Gas type: Ar gas
Gas flow rate: 10 to 40 sccm (Oxide Film Forming Step)

Next, the substrate 1 is conveyed to a vacuum chamber containing target made of for example Ge. The vacuum chamber is vacuumed until the inter pressure becomes a predetermined value. Thereafter, while a process gas is being supplied to the vacuum chamber, the target is spattered such that the oxide film 3 is formed on the substrate 1.

The film forming conditions in this film forming step are, for example, as follows.

Achieved degree of vacuum: $5.0 \times 10^{-5}$ Pa
Atmosphere: 0.1 to 0.6 Pa
Input power: 1 to 3 kW
Gas types: Ar gas and $O_2$ gas
Ar gas flow rate: 24 sccm
$O_2$ gas flow rate: 9 sccm (Dielectric Film Forming Step)

Next, the substrate 1 is conveyed to a vacuum chamber containing target made of for example Si. The vacuum chamber is vacuumed until the inter pressure becomes a predetermined value. Thereafter, while a process gas is being supplied to the vacuum chamber, the target is spattered such that the dielectric film 4 is formed on the substrate 1.

The film forming conditions in this film forming step are, for example, as follows.

Achieved degree of vacuum: $5.0 \times 10^{-5}$ Pa
Atmosphere: 0.1 to 0.6 Pa
Input power: 1 to 4 kW
Gas types: Ar gas and nitrogen gas
Ar gas flow rate: 50 sccm
Nitrogen gas flow rate: 37 sccm (Light Transmission Layer Forming Step)

Next, an annular light transmission sheet is adhered to the uneven surface 11 side of the substrate 1 with the pressure sensitive adhesive (PSA) equally coated on one principal surface of the sheet. As a result, the light transmission layer 5 is formed such that it covers the films formed on the substrate 1.

In these steps, the write-once type optical recording medium 10 shown in FIG. 1 can be fabricated.

According to the first embodiment of the present invention, the following effects can be obtained.

Since the write-once type optical recording medium can be fabricated by successively forming only the metal film 2, the oxide film 3, the dielectric film 4, and the light transmission layer 5, the write-once type optical recording medium 10, which has a simple film structure and a high recording density, namely the write-once type optical recording medium 10, which has a high recording density, can be provided at low cost.

When the absorption coefficient k of the oxide film 3, which composes the inorganic recording film 6, is specified in the range of $0.15 \leq k \leq 0.90$, the write-once type optical recording medium 10, which has excellent recording and reproducing characteristics, can be provided.

In the write-once type optical recording medium 10 according to the first embodiment, before and after recording is performed, the physical characteristics of the inorganic recording film 2 nearly do not vary, but it accelerate a reaction in the interface with the oxide film 3, namely acts like a catalyst. After recording is performed, oxygen is separated from the oxide film 3 and a Ge layer containing much oxygen is formed in the interface of the inorganic recording film 2. In this manner, the oxide film 3 is separated into two layers that have different optical constants and high storage stability. When reproducing light is radiated to these layers, since the reflection light amount varies, an excellent signal can be obtained.

In addition, in the write-once type optical recording medium 10 according to the first embodiment, the recording sensitivity can be stably improved and the recording characteristics can be improved (jitter can be decreased). With the dielectric film 4 made of $ZnS$—$SiO_2$, the S/N ratio of a record signal can be improved and excellent characteristics can be obtained.

(2) Second Embodiment

Next, a second embodiment of the present invention will be described.

Figure 2:
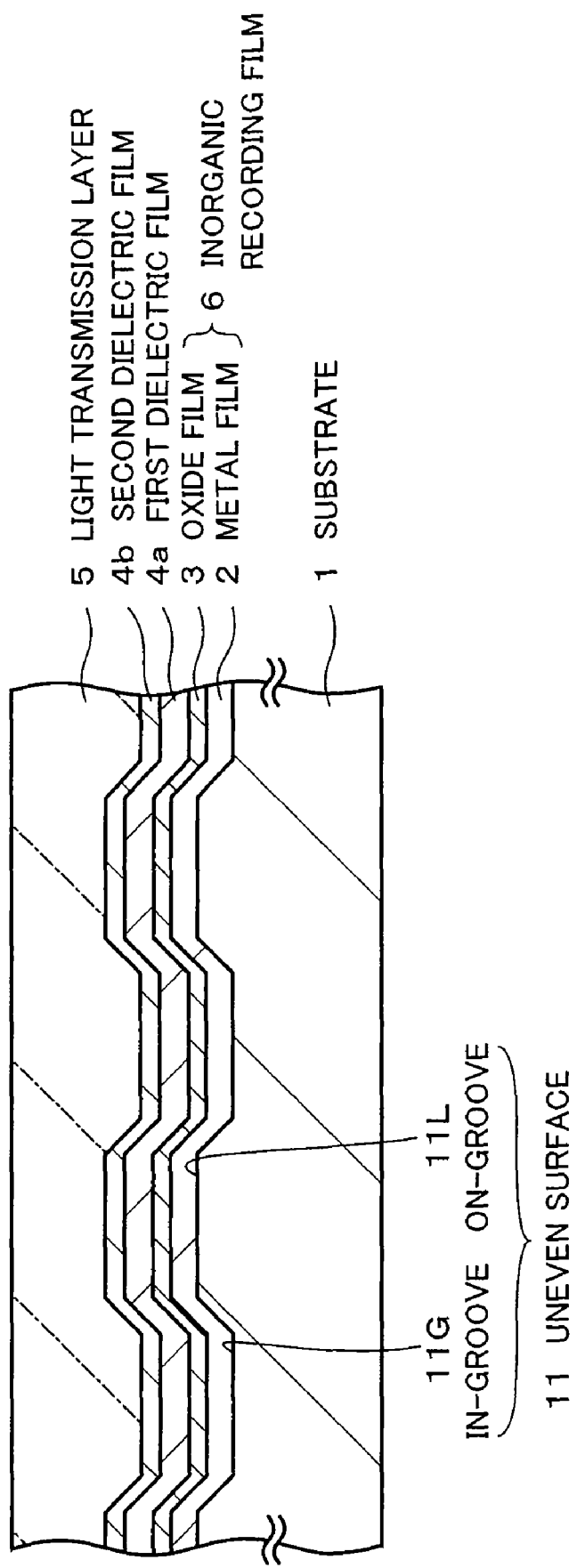
FIG. 2 is a schematic sectional view showing an example of the structure of a write-once type optical recording medium according to a second embodiment of the present invention.

FIG. 2 is a schematic sectional view showing an example of the structure of a write-once type optical recording medium 10 according to the second embodiment of the present invention. The write-once type optical recording medium 10 has a structure in which an inorganic recording film 6, a first dielectric film 4a, a second dielectric film 4b, and a light transmission layer 5 have been successively formed on a substrate 1. The inorganic recording film 6 is composed of a metal film 2 and an oxide film 3 successively formed on the substrate 1.

Since the structure of the write-once type optical recording medium 10 according to the second embodiment is the same as the structure of the write-once type optical recording medium 10 according to the first embodiment except for the metal film 2, the first dielectric film 4a, and the second dielectric film 4b, only these films will be described in the following.

The metal film 2 is made of an oxide of Ti or an oxide of a material containing Ti as a main component. The material containing Ti as a main component is for example a material made of Ti and an additive. When Ti is a main component, excellent recording characteristics can be basically obtained. An additive is used to improve optical characteristics, durability, and/or recording sensitivity. Examples of the additive include Al, Ag, Cu, Pd, Ge, Si, Sn, Ni, Fe, Mg, V, C, Ca, B, Cr, Nb, Zr, S, Se, Mn, Ga, Mo, W, Tb, Dy, Gd, Nd, Zn, and Ta.

The oxygen content of the metal film 2 is preferably in the range from 9 atomic % to 38 atomic %. When the metal film 2 contains TiSi, the Si composition is preferably in the range from 8 atomic % to 32 atomic %. When the Si composition is less than 8 atomic %, the jitter value exceeds the value specified in the standard. When the Si composition exceeds 32 atomic %, the recording sensitivity exceeds the value specified in the standard.

The first dielectric film 4a is made of for example ZnS—$SiO_2$. The thickness of the first dielectric film 4a is preferably in the range from 10 nm to 58 nm, more preferably in the range from 23 nm to 53 nm. When the film thickness of the first dielectric film 4a is 10 nm or more, excellent jitter can be obtained. In the case of which the write-once type optical recording medium 10 is BD-R, when the film thickness of the first dielectric film 4a is 10 nm or more, jitter of 6.5% or less as the value specified in the BD-R standard can be satisfied. In contrast, when the film thickness of the first dielectric film 4a is 58 nm or less, an excellent reflectance ratio can be obtained. In the case of which the write-once type optical recording medium 10 is BD-R, when the film thickness of the first dielectric film 4a is 58 nm or less, a reflectance ratio of 12% or less as the value specified in the BD-R standard can be satisfied.

When the film thickness of the first dielectric film 4a is 23 nm or more, more excellent jitter can be obtained. When the film thickness of the first dielectric film 4a is 53 nm or less, a further more excellent reflectance ratio can be obtained.

The second dielectric film 4b is made of for example SiN. The thickness of the second dielectric film 4b is preferably selected to be 35 nm or less. When the film thickness of the second dielectric film 4b is 35 nm or less, excellent jitter can be obtained. In the case of which the write-once type optical recording medium 10 is BD-R, when the film thickness of the second dielectric film 4b is 35 nm or less, jitter of 6.5% or less as the value specified in the BD-R standard can be satisfied. When the first dielectric film 4a and the second dielectric film 4b are adjacently formed, the modulation degree can be increased and the C/N ratio can be increased.

(3) Third Embodiment

Structure of Write-once Type Optical Recording Medium

As in the first embodiment, a write-once type optical recording medium 10 according to a third embodiment has a structure in which an inorganic recording film 6, a dielectric film 4, and a light transmission layer 5 have been successively formed on a substrate 1. Since the materials and thicknesses of these layers formed on the substrate 1 according to the third embodiment are the same as those of the first embodiment, their description will be omitted.

Figure 3:
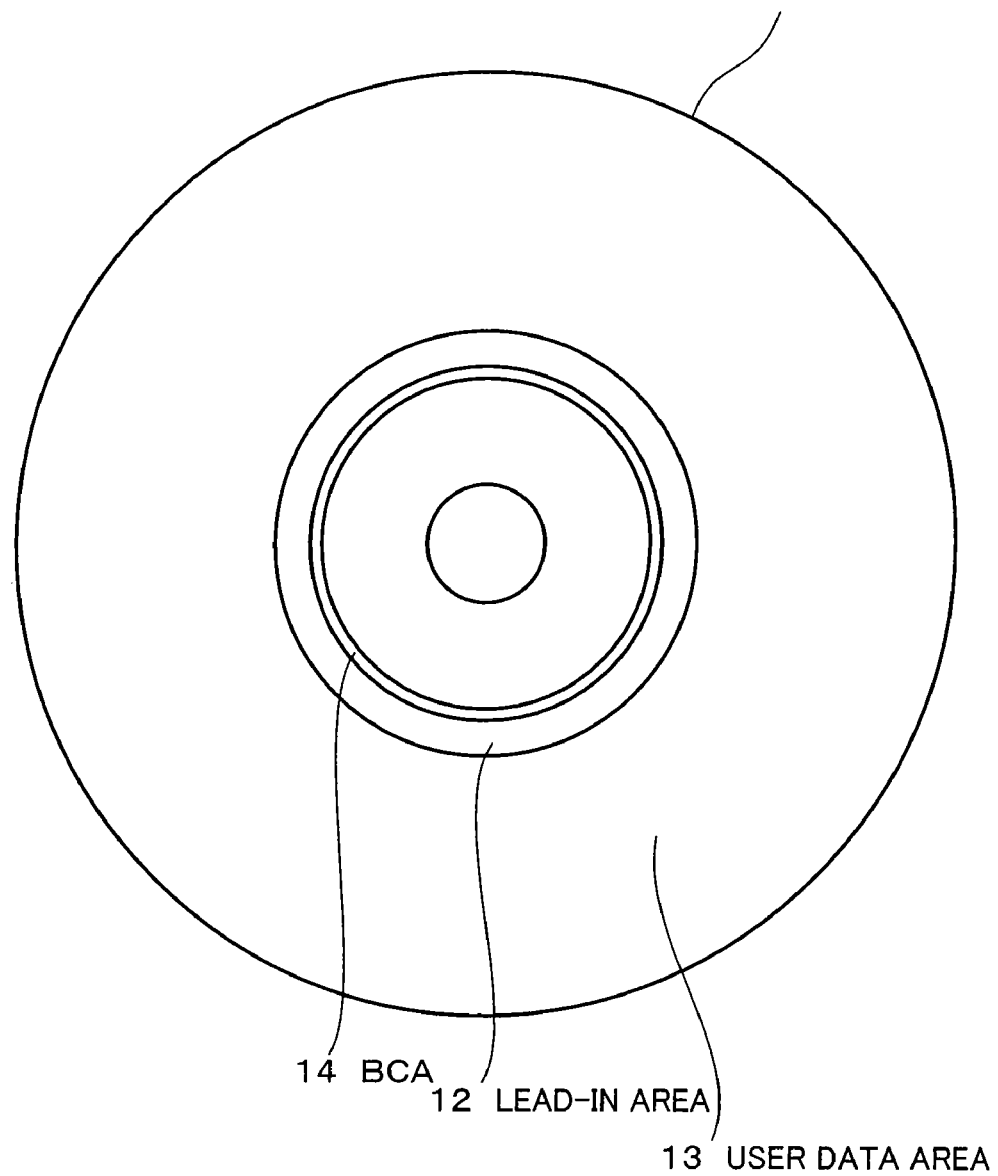
FIG. 3 is a plan view showing a write-once type optical recording medium according to a third embodiment of the present invention.

FIG. 3 is a plan view showing the write-once type optical recording medium according to the third embodiment of the present invention. As shown in FIG. 3, a lead-in area 12 is disposed at an inner circumference portion of the write-once type optical recording medium 10. A user data area 13 is disposed at an outer circumference portion of the lead-in area 12. In the lead-in area 12, a BCA (Burst Cutting Area) 14 that is an identification information recording area is disposed.

The user data area 13 is an area in which the user records his or her desired data. The lead-in area 12 is an area in which information for example identification information (ID), an encryption key, and a decryption key is recorded. When the write-once type optical recording medium 10 is fabricated, these information is recorded in the lead-in area 12. The BCA 14 is an area in which identification information is recorded when the write-once type optical recording medium 10 is fabricated. The identification information is information unique to each medium. The identification information is aimed at preventing data of the medium from being illegally copied.

Method of Fabricating Write-once Type Optical Recording Medium

Since the steps from the substrate molding step to the light transmission layer forming step of the third embodiment are the same as those of the first embodiment, their description will be omitted. In the following, an identification information recording step preceded by the light transmission layer forming step will be described.

Figure 4:
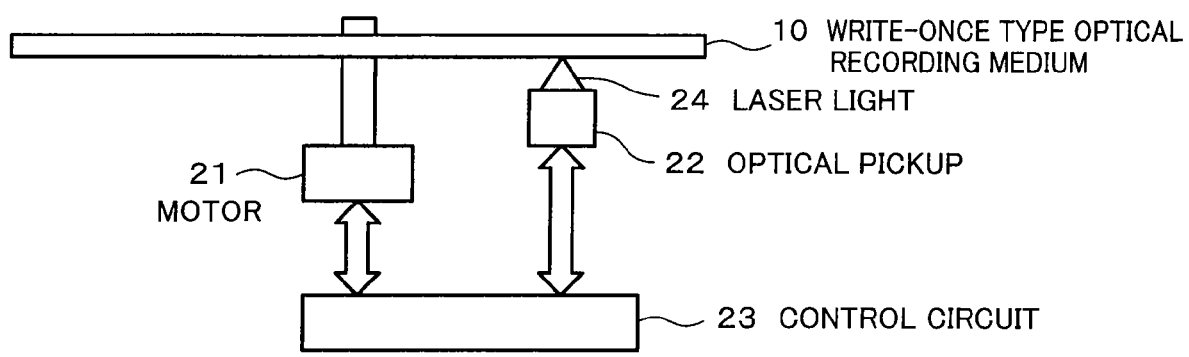
FIG. 4 is a block diagram showing the structure of a recording apparatus used to record unique information to the write-once type optical recording medium according to the third embodiment of the present invention.

First, with reference to FIG. 4, a recording apparatus used to record identification information will be described. As shown in FIG. 4, the recording apparatus has a motor 21, an optical pickup 22, and a control circuit 23.

The optical pickup 22 is an optical system that radiates laser light 24 to the write-once type optical recording medium 10 and records identification information as a bar code. The wavelength of the laser light 24 is preferably nearly the same as that of laser light used to record and/or reproduce user data. When the write-once type optical recording medium 10 is a medium to and from which user data are recorded and/or reproduced with blue color laser light having a wavelength of 405 nm, it is preferred that the wavelength of the laser light 22 of the optical pickup 22 be set in the range from 350 nm to 450 nm. With the laser having this wavelength range, recording marks corresponding to identification information can be satisfactorily recorded to the inorganic recording film 6 based on the same theory as are the user data.

The control circuit 23 controls the whole recording apparatus. For example, the control circuit 23 controls focusing of the laser light 24, the position of the optical pickup 22, and the rotation of the motor 21, and generates identification information. The motor 21 rotates the write-once type optical recording medium 10 placed on a turn table (not shown).

Next, an identification information recording step using the foregoing recording apparatus will be described.

First, the write-once type optical recording medium 10 is placed on the turn table (not shown) such that the light transmission layer 5 side faces the optical pickup 22. Next, the motor 21 is driven to rotate the write-once type optical recording medium 10 at a predetermined speed.

After the optical pickup 22 is moved to the BCA 14 formed in the inner circumference portion of the write-once type optical recording medium 10, the optical pickup 22 is driven such that laser light modulated in a pulse shape corresponding to for example identification information is radiated from the light transmission layer 5 side. Thus, in the portion, to which the laser light 24 is radiated, of the inorganic recording film 6, oxygen is separated from the oxide film 3 and thereby a high oxygen concentration layer is formed on the inorganic recording film 2 side and a low oxygen concentration layer is formed on the dielectric film 4 side. As a result, recording marks corresponding to the identification information are formed in for example a bar code shape and thereby the identification information is recorded to the BCA 14. The wavelength of the laser light that causes the recording marks to be formed is preferably in the range from 350 nm to 450 nm as described above. In this step, the desired write-once type optical recording medium 10 can be fabricated.

Figures 5A, 5B:
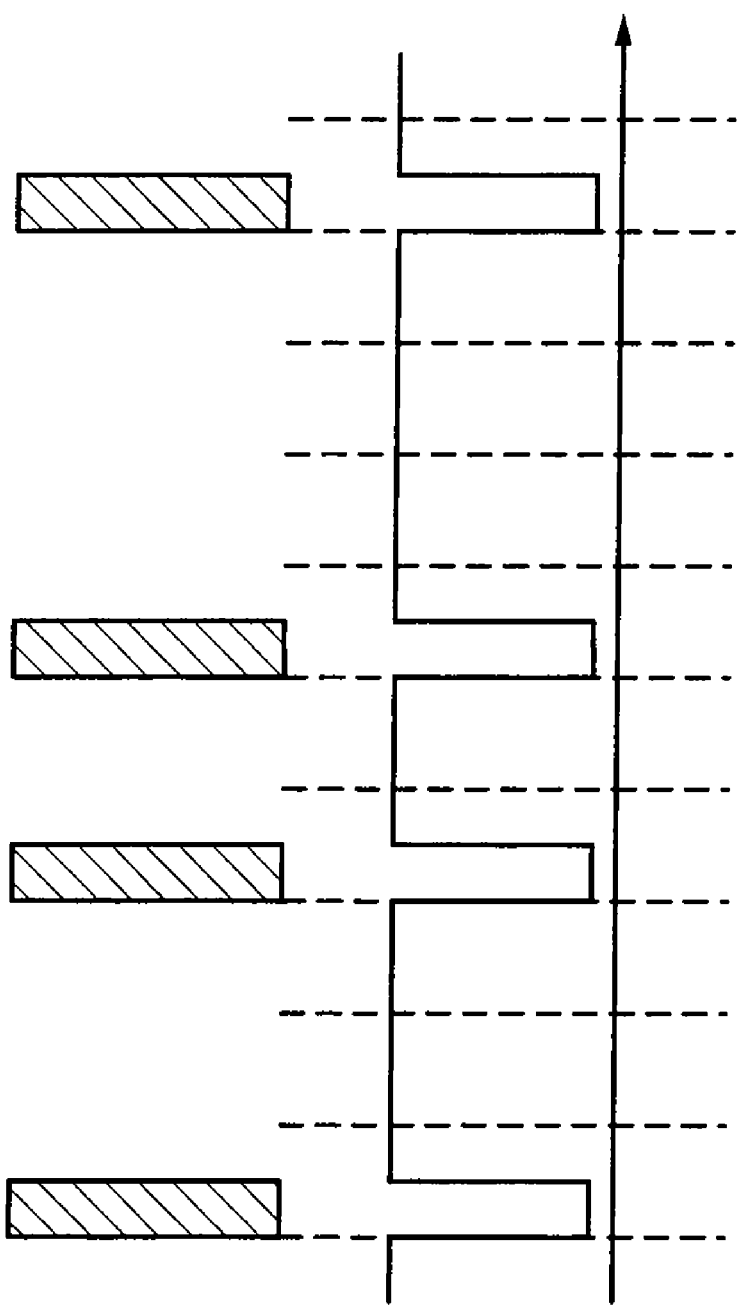
FIG. 5A is a schematic diagram showing an example of a recording mark formed in a BCA.
FIG. 5B is a schematic diagram showing an example of a waveform of a reproduction signal of unique information reproduced from the BCA.

FIG. 5A shows an example of recording marks formed in the BCA 14. FIG. 5B shows an example of a waveform of a reproduction signal of which identification information is reproduced from the BCA 14. In FIG. 5A, hatched portions represent recording marks. These recording marks are formed by radiation of laser light modulated in a pulse shape.

As shown in FIG. 5A, identification information is recorded as a bar code shape stripe pattern in the BCA 14. Since the reflectance ratio of the recording marks is low, a reproduction signal has a pulse shaped waveform as shown in FIG. 5B.

In the third embodiment, since identification information is recorded to the BCA 14 of the write-once type optical recording medium 10 with laser light having a wavelength in the range from for example 350 nm to 450 nm, identification information can be recorded to the inorganic recording film 6 in the same theory as are the user data. Thus, the disturbance of a reproduction signal of identification information can be suppressed and a desired reproduction signal can be obtained. In comparison with the case that identification information is recorded by melt-removing formed layers on the substrate 1 by laser radiation from the light transmission layer 5 side, abnormality of a signal due to deformation of the substrate 1 can be suppressed. In addition, since formed layers are less likely to be corroded, excellent storage stability can be obtained.

(4) Fourth Embodiment

Structure of Write-once Type Optical Recording Medium

A write-once type optical recording medium 10 according to a fourth embodiment has a BCA 14 in which identification information has been recorded. The identification information is formed by melt-removing formed films on the substrate 1 by laser radiation from the substrate 1 side. Since the other structure of the write-once type optical recording medium 10 according to the fourth embodiment is the same at that according to the third embodiment, their description will be omitted.

Method of Fabricating Write-once Type Optical Recording Medium

Since the steps from the substrate molding step to the light transmission layer forming step in this embodiment are the same as those in the third embodiment, their description will be omitted. In the following, an identification information recoding step preceded by the light transmission layer forming step will be described. Since a recording apparatus that records identification information is the same as that in the third embodiment except that an optical path length correction device is disposed in an optical pickup 2, the description of the recoding apparatus will be omitted. The optical path length correction device of the optical pickup 22 is disposed because laser light is radiated through a substrate 1 side unlike the third embodiment.

First, the write-once type optical recording medium 10 is placed on a turn table (not shown) such that the substrate 1 side faces the optical pickup 22. Next, a motor 21 is driven to rotate the write-once type optical recording medium 10 at a predetermined speed.

After the optical pickup 22 is moved to a BCA 14 formed in an inner circumference portion of the write-once type optical recording medium 10, the optical pickup 22 is driven such that laser light modulated in a pulse shape corresponding to for example identification information is radiated through the substrate 1 side. Thus, a metal film 2, an oxide film 2, and a dielectric film 5 are melt-removed from the portion, to which laser light is radiated, of the inorganic recording film 6. As a result, marks corresponding to the identification information are formed in for example a bar code shape and thereby the identification information is recorded to the BCA 14.

The laser light is preferably near infrared laser light or infrared laser light having a wavelength of for example 800 nm. In addition, the optical head scan speed upon laser light radiation is preferably in the range from 5 m/s to 9 m/sec and the laser power is preferably in the range from 3400 mW to 4000 mW. When the optical head scan speed and the laser power are in these ranges, a sharp increase of the reflectance ratio at an edge portion of a recording mark can be suppressed. Thus, noise of a reproduction signal of the identification information can be decreased.

In the fourth embodiment, identification information is recorded by radiating laser light to the BCA 14 through the substrate 1 side, not through the light transmission layer 5 side for recording and/or reproducing of user data. Thus, since light absorption characteristics and so forth of laser light radiated through the substrate 1 side are different from those through the light transmission layer 5 side, deformation of the boundary portion of a mark can be suppressed. Residue of a part of formed films in the BCA 14 can be suppressed. In addition, deformation of the substrate 1 can be suppressed. In other words, disturbance of a reproduction signal can be suppressed and a desired reproduction signal can be obtained.

In addition, since laser light can be directly radiated to the metal film 2, the formed films can be effectively destructively removed from the substrate 1. When laser light is radiated through the light transmission layer 5 side, since the oxide film 3 absorbs heat, it diffuses therein. Thus, it can be thought that because of this reason the formed layers are not able to be clearly destructively removed from the substrate 1.

Next, the present invention will be more specifically described with examples. However, it should be noted that the present invention is not limited to these examples. In the following examples, similar portions to the foregoing embodiments will be denoted by similar reference numerals.

As examples according to the present invention, write-once type optical recording mediums designed corresponding to an optical disc recording and reproducing apparatus that is an optical system for blu-ray discs and that uses a two-group objective lens system having a numerical aperture of 0.85 and a blue-purple semiconductor laser light source having a wavelength of 405 nm.

Examples 1 to 6 are examples corresponding to the first embodiment of the present invention. Examples 7 to 14 are examples corresponding to the second embodiment of the present invention. Examples 15 to 16 are examples corresponding to the third embodiment of the present invention. Examples 17 to 36 are examples corresponding to the fourth embodiment of the present invention.

First, examples 1 to 6 corresponding to the first embodiment of the present invention will be described in the order.

(1-1) Consideration of film structure of write-once type optical recording medium
  (1-2) Consideration of oxygen composition of oxide film
  (1-3) Consideration of film thickness of oxide film
  (1-4) Consideration of film thickness of dielectric film (1-1) Consideration of Film Structure of Write-once Type Optical Recording Medium First, the film structure of write-once type optical recording mediums 10 was considered based on the C/N ratio, modulation degree, and reflectance ratio.

EXAMPLE 1

Figure 6:
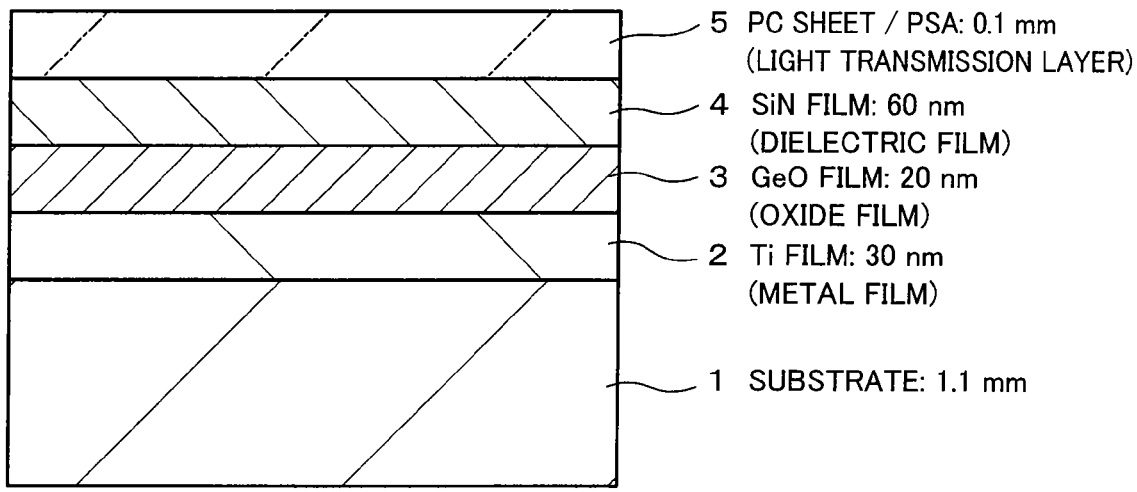
FIG. 6 is a schematic sectional view showing the structure of a write-once type optical recording medium according to example 1.

FIG. 6 is a schematic sectional view showing the structure of a write-once type optical recording medium according to example 1. In FIG. 6, in-grooves 11G and on-grooves 11L formed in a substrate 1 are omitted.

The substrate 1 having the in-grooves 11G and the on-grooves 11L formed in one principal surface was molded by the injection molding method. As a resin material, polycarbonate resin was used. The pitches, namely, the track pitches, of the in-grooves and on-grooves were 0.32 μm (value specified in the BD standard). The depth of the in-grooves 11G was 20 nm. The on-grooves 11L were wobbled to add address information.

Next, with a film forming unit (Manufacturer: Unaxis Company; Model name: Cube), a Ti film 2, a GeO film 3, an SiN film 4 were successively formed on the substrate 1. The target size was 200 mm in diameter. Next, the film forming steps of these layers by the film forming unit will be described.

After a vacuum chamber was vacuumed, while Ar gas was being supplied to the vacuum chamber, Ti target was spattered such that the Ti film 2 having a film thickness of 30 nm was formed on the substrate 1. When the T1 film 2 was formed, the flow rate of Ar gas was 24 sccm and the spatter power was 3.0 kW.

Next, the substrate 1 was conveyed to another vacuum chamber without exposure to air. While Ar gas and $O_2$ gas were being supplied to the vacuum chamber, Ge target was reactively spattered such that the GeO film 3 having a thickness of 20 nm was formed on the Ti film 2. When the GeO film 3 was formed, the flow rate of the Ar gas was 24 sccm, the flow rate of the $O_2$ gas was 9 sccm, and the spatter power was 2 kW.

Next, the substrate 1 was conveyed to another vacuum chamber without exposure to air. While Ar gas and $N_2$ gas were being supplied to the vacuum chamber, Si target was reactively spattered such that the SiN film 4 having a film thickness of 60 nm was formed on the GeO film 3. When the SiN film 4 was formed, the flow rate of the Ar gas was 50 sccm, the flow rate of the $N_2$ gas was 37 sccm, and the spatter power was 4 kW. The atomic ratio of the composition of the SiN film 4 was 3:4, the refractive index was 2.0, and the absorption coefficient was 0.

Next, an annular polycarbonate sheet was adhered to the substrate 1 with a PSA pre-coated on one principal surface of the sheet such that the light transmission layer 5 having a film thickness of 0.1 mm was formed. In the foregoing steps, the desired write-once type optical recording medium 10 was fabricated.

Next, the light transmission layer 5 was peeled from the write-once type optical recording medium 10 to examine the oxygen composition of the GeO film 3 of the obtained write-once type optical recording medium 10. An area of 2 cm×2 cm was cut as an analysis sample from the recording area. Next, the oxygen composition of the analysis sample was measured by the RBS (Rutherford Backscattering) analyzing method. As a result, it was found that the composition ratio (atomic ratio) of the GeO film was 1:1.7. In this measurement, a measurement unit made by Sony Corporation was used.

Next, to examine the absorption coefficient of the GeO films 3 of each of the write-once type optical recording mediums 10 fabricated in the foregoing manner, analysis samples were fabricated in the following manner.

In other words, in the same conditions as the film forming step of the GeO film 3 of the write-once type optical recording medium 10, a GeO film having a film thickness of around 100 nm was formed on a Si wafer having a size of 2 cm×2 cm and thereby analysis samples were fabricated.

Next, the absorption coefficient of each of the analysis samples against laser radiation having a wavelength of 410 nm was measured by an ellipsometer. As a result, it was found that the absorption coefficient of the GeO film was 0.40. The ellipsometer was a RUDOLPH Auto EL-462P17.

In the structure of the real write-once type optical recording medium 10, when the light transmission layer 5 is peeled therefrom, the absorption coefficient of the light transmission layer 5 is measured by the ellipsometer, the film thickness and the composition of each layer are analyzed, and the optical constant of each layer is converted, then the absorption coefficient of the GeO film 3 can be obtained.

Next, the carrier-to-noise ratio (C/N ratio), modulation degree, and reflectance ratio of the write-once type optical recording mediums 10 fabricated in the foregoing manner were measured.

The units that measured the C/N ratio, modulation degree, and reflectance ratio and their measurement conditions were as follows.

The evaluation unit was a Pulstec DDU-1000. These characteristics were measured in the conditions of which the linear velocity was 5.28 m/s and the channel bit length was 80.0 nm. These characteristics were based on the BD standard for 23.3 GB density. The modulation system was 17 PP, the shortest mark length was 2 T (0.16 μm), and the longest mark length was 8 T (0.64 μm).

The C/N ratio was measured by a spectrum analyzer (Manufacturer: Takeda Riken Co.; Model name: TR4171). The RBW (Resolution Band Width) was set to 30 kHz.

When the mark length was 8 T, the C/N ratio was as high as 61 dB. When the mark length was 2 T, the C/N ratio was as high as 45 dB. As practical levels, it is preferred that when the mark length is 2 T, the C/N ratio be 43 dB or more and when the mark length is 8 T, the C/N ratio be 55 dB or more.

The modulation degree was 80%, which represented a very excellent recording and reproducing characteristic. When the return light amount of a space portion in 8 T is I8H and the return light amount of a mark portion in 8 T is I8L, the modulation degree is defined as (I8H−I8L)/I18H.

The reflectance ratio was 10%. Although detail description is omitted, in the same manner as in the foregoing example 1 except that Al was added to the Ti film 2, a write-once type optical recording medium 10 was fabricated. The reflectance ratio of the write-once type optical recording medium 10 was measured in the same manner as in the foregoing example 1. As a result, by adding Al to the Ti metal film, a reflectance ratio of 20% or more was obtained.

The foregoing evaluation results show that with a small number of films, namely the three layers of the Ti film 2, the GeO film 3, and the SiN film 4, a write-once type optical recording medium 10 having excellent C/N ratio, modulation degree, and reflectance ratio corresponding to a high recording density can be accomplished. In other words, it is found that a write-once type optical recording medium 10 that is fabricated at low cost with high producibility and high recording density can be provided.

Comparison 1

In the foregoing example 1, the case of which the Ti film 2 is formed on the GeO film 3 such that they contact with each other was described. In comparison 1, the case of which a dielectric film is disposed between a GeO film 3 and a Ti film 2 will be described.

Figure 7:
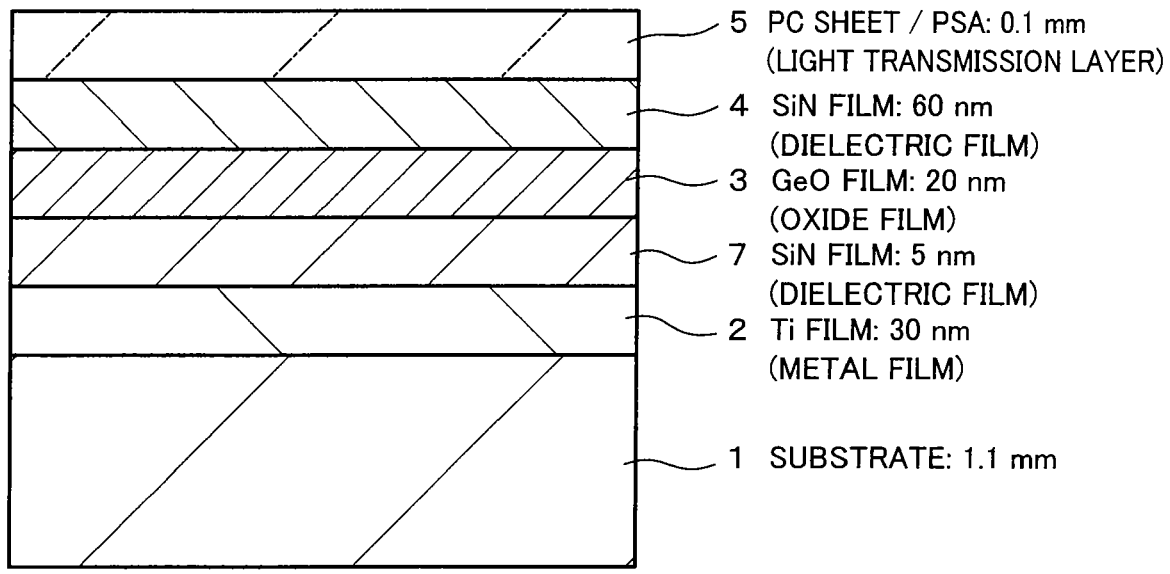
FIG. 7 is a schematic sectional view showing the structure of a write-once type optical recording medium according to comparison 1.

FIG. 7 is a schematic sectional view showing the structure of a write-once type optical recording medium according to comparison 1. In comparison 1, a write-once type optical recording medium 10 was fabricated in the same manner as in the foregoing example 1 except that a SiN film having a film thickness of 5 nm was formed between the Ti film 2 and the GeO film 3.

Next, the C/N ratio, modulation degree, and reflectance ratio of the write-once type optical recording medium 10 that had been fabricated in the foregoing manner were measured. The units that measured the C/N ratio, modulation degree, and reflectance ratio and their measurement conditions were the same as those of the foregoing example 1.

When the mark length was 8 T, the C/N ratio was 44 dB. When the mark length was 2 T, the C/N ratio was 31 dB. Thus, the recording characteristics of the write-once type optical recording medium 10 according to comparison 1 were less than those of the write-once type optical recording medium 10 according to the foregoing example 1. Thus, it can be thought that the Ti film 2 needs to be in contact with the GeO film 3 as in example 1. In other words, it can be thought that the recording theory is based on the state that the Ti film 2 and the GeO film 3 react on their interfaces. Thus, when a metal material or a metal oxide that is highly active is formed in contact with the GeO film 3, recording is satisfactorily performed. As in comparison 1, it is found that when both principal surfaces of the GeO film 3 are protected by dielectric films 4 and 7 made of a stable material, recording is not satisfactorily preformed.

Although the dielectric film 7 having a film thickness of 5 nm does not nearly affect thermal and optical characteristics, it separates the Ti film 2 from the GeO film 3. As a result, the reflectance ratio after recording is higher than that before recording, namely low-to-high recording is performed. As a result, the modulation degree was −13%, which was much less than that of example 1.

The film thickness distributions of the Ti film 2 before and after recording were measured by the cross-sectional TEM observation method using a TEM (Transmission Electron Microscope). The result showed that the film thickness of the Ti film 2 was not varied, that the GeO film 3 was separated into an oxygen-rich layer and a Ge-rich layer, and that the oxygen-rich layer was formed on the Ti film 2 side. Thus, the present invention uses a new recording theory that is completely different from the recording theory in which a metal is oxidized disclosed in the foregoing patent document 1.

EXAMPLE 2

Figure 8:
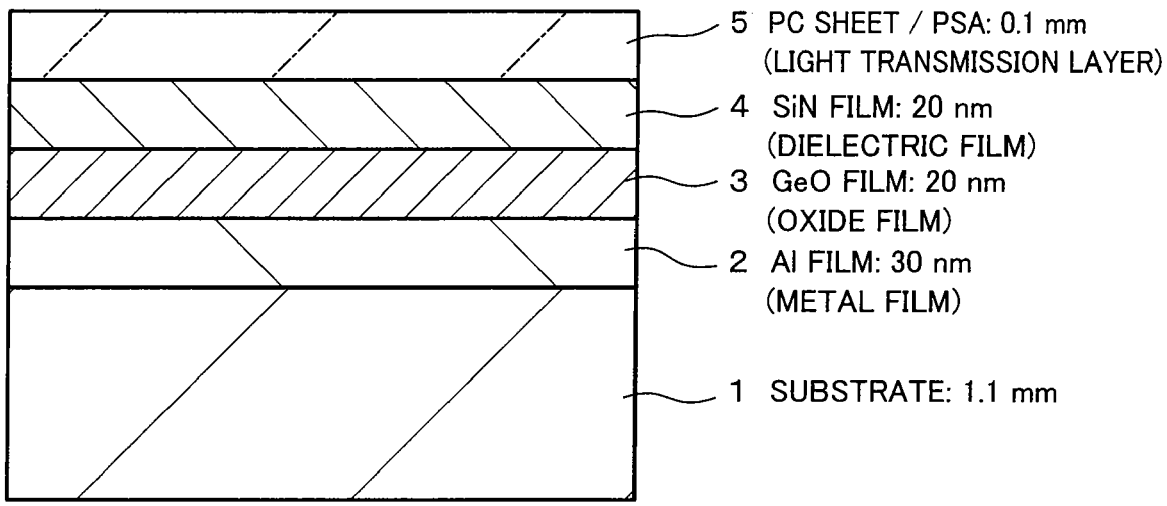
FIG. 8 is a schematic sectional view showing the structure of a write-once type optical recording medium according to example 2.

FIG. 8 is a schematic section view showing the structure of a write-once type optical recording medium according to example 2. In example 2, a write-once type optical recording medium 10 was fabricated in the same manner as in example 1 except that the metal film 2 was an Al film and the dielectric film 4 was a SiN film having a film thickness of 20 nm.

The film thickness of the SiN film 4 in example 2 is smaller than that in example 1 from an optical view. In other words, since the optical constant of Al used as the metal film 2 is largely different from that of Ti, the effect of multiple interference by SiN is different. Thus, the film thickness of the SiN film 4 was optimized such that a desired reflectance ratio was obtained.

Next, the C/N ratio and reflectance ratio of the write-once type optical recording medium 10 fabricated in the foregoing manner were evaluated. The units that measured the C/N ratio and reflectance factor and their measurement conditions were the same as those in the foregoing example 1.

In the write-once type optical recording medium 10 according to example 2, the return light from a recording mark after recording was higher than that before recording, namely low-to-high recording was performed. When the mark length was 8 T, the C/N ratio was 55 dB. When the mark length was 2 T, the C/N ratio was 42 dB. Thus, in example 2, recording characteristics were excellent.

Although the write-once type optical recording medium 10 according to example 2 does not satisfy the BD standard, the write-once type optical recording medium 10 can accomplish high density recording. Thus, the write-once type optical recording medium 10 according to example 2 can be sufficiently used as a write-once type optical recording medium 10 that is not based on the BD standard. It can be easily estimated that the write-once type optical recording medium 10 according to example 2 can satisfy the BD standard when fabrication conditions are properly selected.

In the write-once type optical recording medium 10 according to example 2, since an AL film was used as the metal film 2, the durability was able to be improved. In addition, in the write-once type optical recording medium 10 according to example 2, with the structure of only three layers of the metal film 2, the oxide film 3, and the dielectric film 4, high density recoding can be accomplished. In addition, since the film thickness of the SiN film 4 is low, the write-once type optical recording medium 10 according to example 2 is industrially advantageous.

EXAMPLE 3

Figure 9:
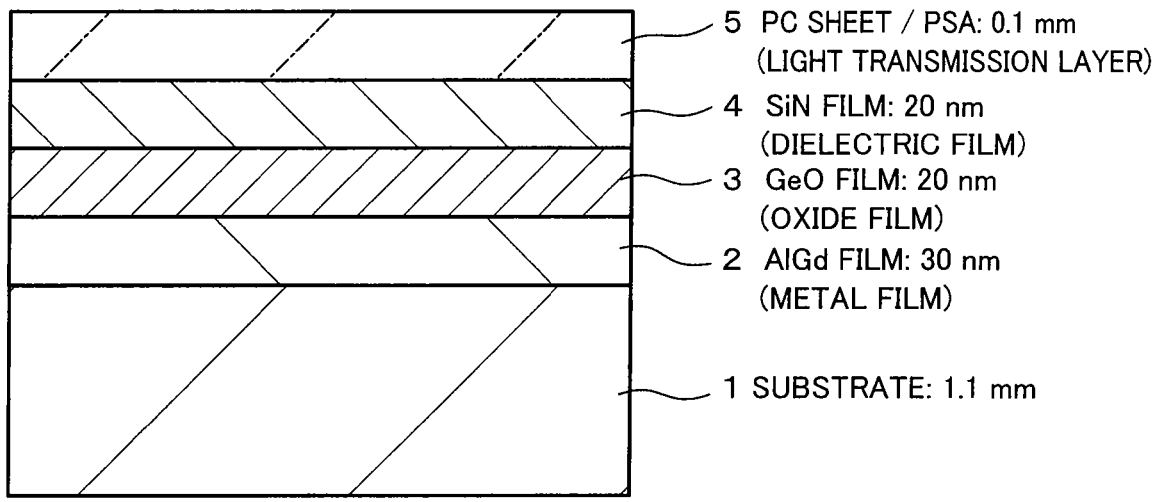
FIG. 9 is a schematic sectional view showing the structure of a write-once type optical recording medium according to example 3.

FIG. 9 is a schematic sectional view showing the structure of a write-once type optical recording medium according to example 3. The write-once type optical recording medium 10 was fabricated in the same manner as in example 2 except that the metal film 2 was composed of AlGd alloy of Al and Gd as a rare earth metal and that the composition ratio (atomic ratio) of the composition of AlGd was Al:Gd=7:3.

Next, the C/N ratio, modulation degree, and reflectance ratio of the write-once type optical recording medium 10 fabricated in the foregoing manner were evaluated. The units that measured the C/N ratio, modulation degree, and reflectance ratio and their measurement conditions were the same as those of the foregoing example 1.

In example 3, the reflectance factor after recording was less than that before recording, namely high-to-low recording was performed. Before recording, the reflectance ratio was around 10% and the modulation degree was 50%. It is found that when optically high-to-low recording is necessary, it is effective to add Al as an additive.

Rare earth metals are prone to be oxidized and have low thermal conductivity. When a rare earth metal and Al are alloyed, the recording sensitivity can be adjusted. Beside Gd, as rare earth metals, there are Tb, Dy, and Nd whose characteristics are very similar. In example 3, with these rare earth metals, nearly similar characteristics can be obtained.

Examples of materials prone to be oxidized are Fe, Mg, V, Ca, B, Nb, Zr, S, Se, Mn, Ga, Mo, and W. With these materials, similar effects can be obtained. They have effects of which the thermal conductivity is lowered, the recording sensitivity is improved, and some of them contribute to improve the durability. As additives to improve the durability of the metal film 2 made of Al or Ti, there are Cu, Pd, Si, Ni, C, Cr, and so forth.

(1-2) Consideration of Oxygen Composition of Oxide Film

Next, the oxygen composition of the oxygen film 3 was changed and the results were considered.

EXAMPLE 4

A plurality of write-once type optical recording mediums 10 were fabricated in the same manner as in example 1 except that the oxygen composition of the oxygen film 3 was changed. In the film forming step of the GeO film 3, the oxygen gas flow rate was changed in the range from 6 sccm to 9 sccm. In addition, the spattering time period was adjusted such that the film thickness of the GeO film 3 became 20 nm.

The C/N ratio of each of the write-once type optical recording mediums 10 fabricated in the foregoing manner was measured. The units that measured the C/N ratios and their measurement conditions were the same as those of the foregoing example 1.

Next, the light transmission layer 5 was peeled from each of the write-once type optical recording mediums 10 to examine the oxygen composition of the GeO film 3 of each of the obtained write-once type optical recording mediums 10. An area of 2 cm×2 cm was cut as an analysis sample from the recording area. Next, the oxygen composition of each of the analysis samples was measured by the RBS (Rutherford Backscattering) analyzing method. As a result, it was found that the composition ratio (atomic ratio) of the GeO film was 1:1.7. In this measurement, a measurement unit made by Sony Corporation was used.

Next, to examine the absorption coefficients of the GeO film 3 of each of the write-once type optical recording mediums 10 fabricated in the foregoing manner, analysis samples were fabricated in the following manner.

In other words, in the same conditions as the film forming step of the GeO film 3 of the write-once type optical recording medium 10, a GeO film having a film thickness of around 100 nm was formed on a Si wafer having a size of 2 cm×2 cm and thereby analysis samples were obtained.

Next, the absorption coefficient of each of the analysis samples against laser radiation having a wavelength of 410 nm was measured by an ellipsometer. The ellipsometer was a RUDOLPH Auto EL-462P17.

In the structure of the real write-once type optical recording medium 10, when the light transmission layer 5 is peeled therefrom, the absorption coefficient of the light transmission layer 5 is measured by the ellipsometer, the film thickness and the composition of each layer are analyzed, and the optical constant of each layer is converted, then the absorption coefficient of the GeO film 3 can be obtained.

Figure 10:
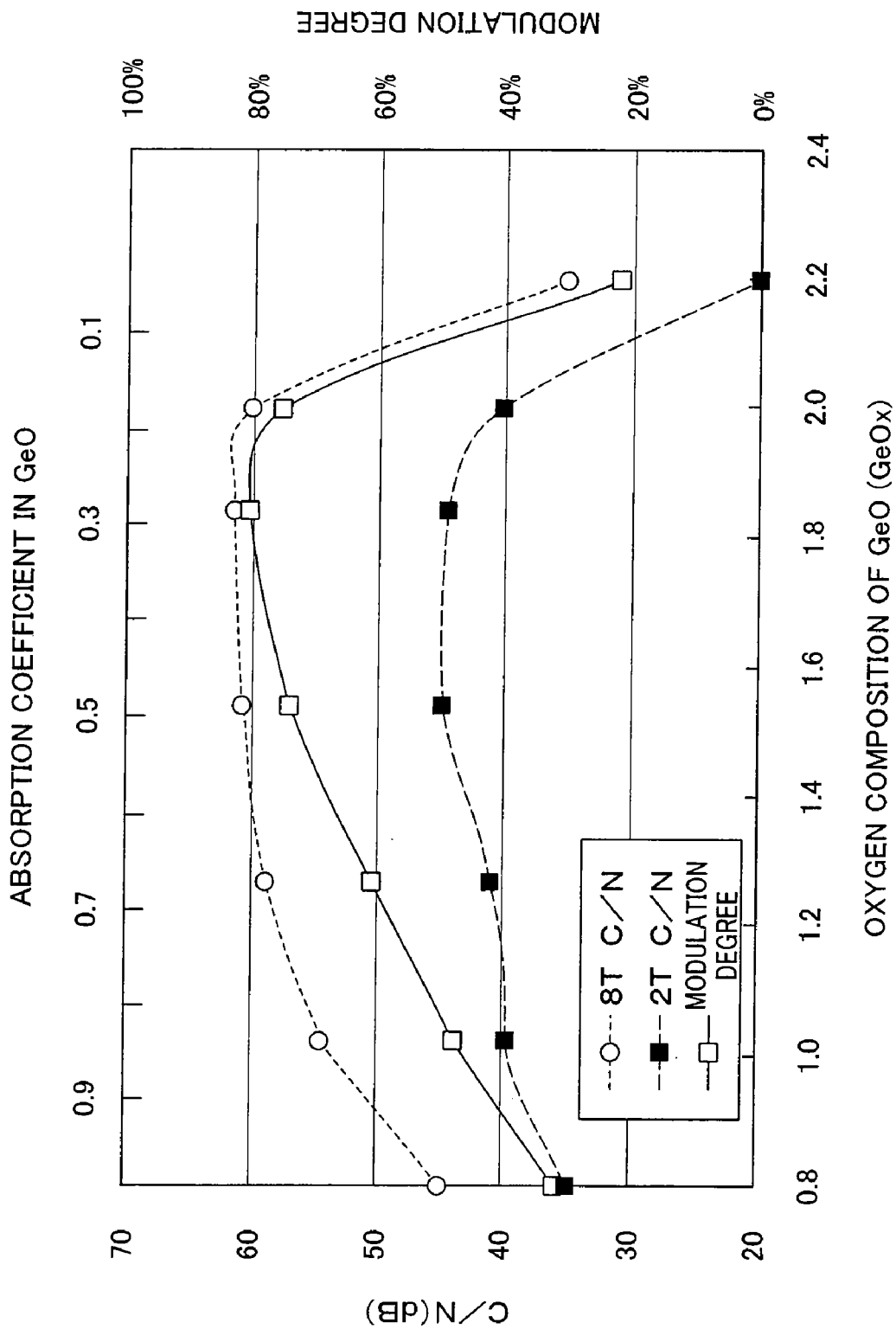
FIG. 10 is a graph showing the relationship of oxygen composition, absorption coefficient, and C/N ratio.

Based on the measured C/N ratio, oxygen composition, and absorption coefficient, a graph shown in FIG. 10 was plotted. FIG. 10 is a graph showing the relationship of the oxygen composition, absorption coefficient, and C/N ratio. In FIG. 10, the horizontal axis represents the oxygen composition and absorption coefficient, whereas the vertical axis represents the C/N ratio. The relationship of the absorption coefficient k and the oxygen composition x generally depends on the material and phase.

FIG. 10 shows the following results.

Focusing on the modulation degree, when the absorption coefficient k becomes less than 0.2, the modulation degree sharply decreases. When the absorption coefficient k exceeds 0.9, the modulation degree becomes 40% or less.

Next, focusing on the C/N ratio with 2 T, when the absorption coefficient k becomes 0.15 or less, the C/N ratio sharply decreases. When the absorption coefficient k exceeds 0.9, the C/N ratio becomes 40 dB or less.

Although detail description is omitted, when the absorption coefficient became less than 0.15, the recording sensitivity sharply deteriorated, resulting in preventing an information signal from being recorded. It is thought that laser was not sufficiently absorbed and much oxygen was stably contained.

Taking into account of the foregoing points, the absorption coefficient k of the GeO film 3 is preferably in the range from 0.15 to 0.90, more preferably in the range from 0.20 to 0.70, further more preferably in the range from 0.25 to 0.6.

The oxygen concentration of the GeO film 3 is preferably in the range from 0.9 to 2.0, more preferably in the range from 1.2 to 1.9, further more preferably in the range from 1.4 to 1.8.

(1-3) Consideration of Film Thickness of Oxide Film

Next, the film thickness of the oxide film 3 was changed and the results were considered.

EXAMPLE 5

A plurality of write-once type optical recording mediums 10 were fabricated in the same manner as the foregoing example 1 except that the film thickness of the GeO film 3 was changed. The C/N ratio and modulation degree of each of the write-once type optical recording mediums 10 were measured. The units that measured the C/N ratios and modulation degree and their measurement conditions were the same as those of the foregoing example 1.

Figure 11:
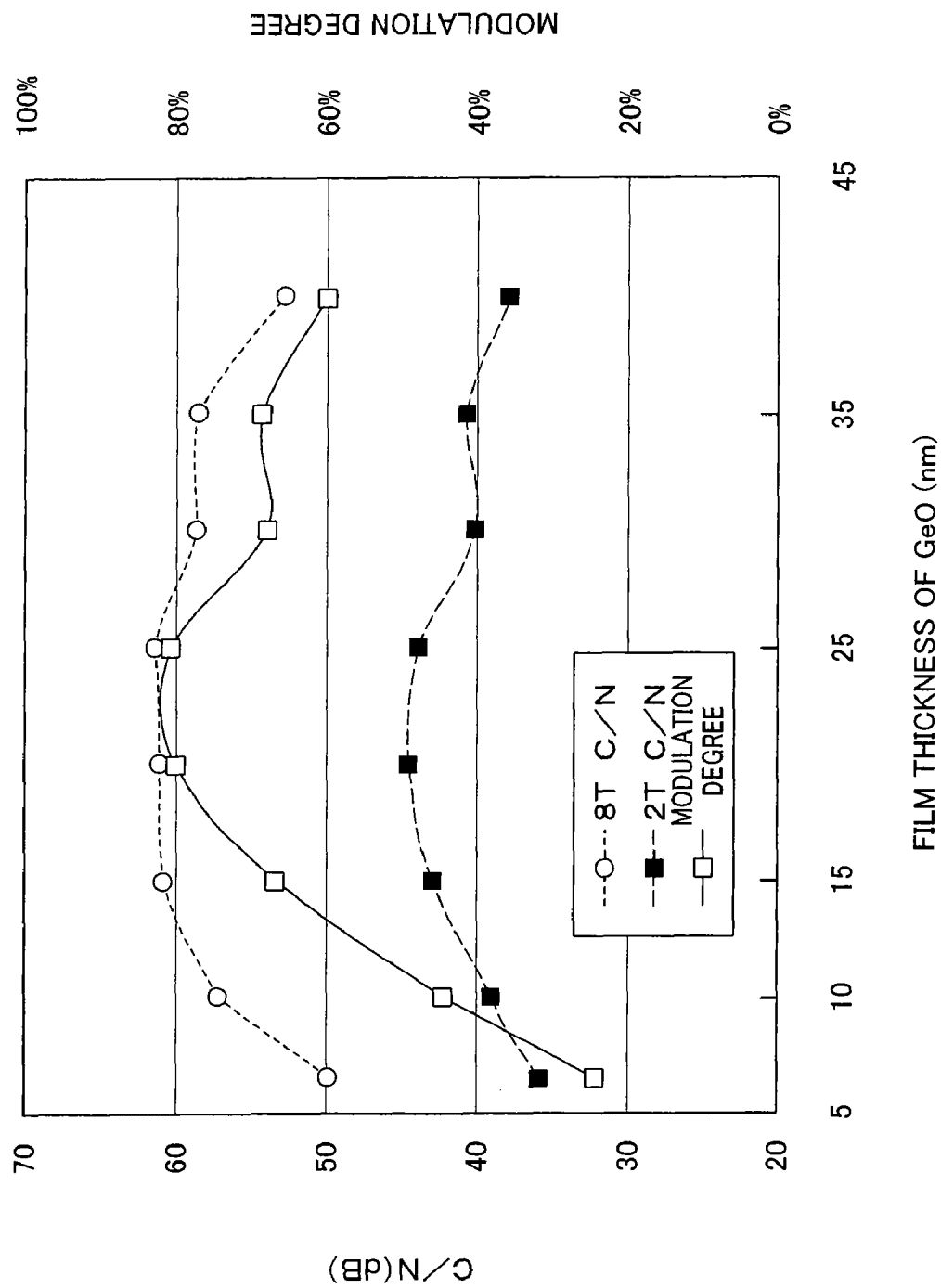
FIG. 11 is a graph showing the relationship of film thickness, C/N ratio, and modulation degree of a GeO film 3.

FIG. 11 is a graph showing the relationship of the film thickness, C/N ratio, and modulation degree of the GeO film 3. FIG. 11 shows that when the film thickness of the GeO film 3 is around 20 nm, the modulation degree and C/N ratios with 8 T and 2 T are the highest and when the film thickness of the GeO film 3 is not 20 nm, the modulation degree and the C/N ratios with 8 T and 2 T decrease.

When the film thickness of the GeO film 3 becomes less than 10 nm, the modulation degree becomes less than 40% and the C/N ratio with 2 T becomes less than 40 dB, namely recording characteristics deteriorate. When the film thickness is in the range from 10 nm to 35 nm, the C/N ratio with 2 T is 40 dB or more. In all the measured range of the film thickness, the C/N ratio with 8 T is 50 dB or more.

Taking into account of the foregoing results, it is found that the film thickness of the GeO film 3 is preferably in the range from 10 nm to 35 nm, the most preferably 20 nm.

(1-4) Consideration of Film Thickness of Dielectric Film

Next, the film thickness of the dielectric film 4 was changed and the results were considered.

EXAMPLE 6

A write-once type optical recording medium 10 was fabricated in the same manner as in the foregoing example 2 except that the film thickness of the SiN film 4 was 10 nm. The C/N ratio of the write-once type optical recording medium 10 was measured. The unit that measured the C/N ratio and the measurement conditions were the same as those of the foregoing example 1. The results show that the recording noise largely increased and the C/N ratio with 8 T decreased to around 40 dB. It can be thought that the rigidity of the SiN film 4 became insufficient. Thus, it is preferred that the film thickness of the SiN film 4 is 10 nm or more.

Since the SiN film 4 also functions as a protection film of the GeO film 3, from a view point of protection of the GeO film 3, it is preferred that the SiN film 4 be as thick as possible. However, from a view point of mass production, it is preferred that the film thickness of the SiN film 4 be 100 nm or less. In this range of the film thickness, the same effect as example 6 can be obtained.

However, the optimum film thickness of the dielectric film 4 depends on the material of the metal film 2 and the material of the dielectric film 4. Thus, it is difficult to unconditionally specify the film thickness of the SiN film 4. For example, in the case of example 1, the optimum film thickness of the dielectric film 4 was 60 nm. In the case of example 2, the optimum film thickness of the dielectric film 4 was 20 nm. In addition, when the dielectric film 4 is made of $SiO_2$, since the refractive index thereof is nearly the same as that of the substrate 1 and the light transmission layer 5, the film thickness of the dielectric film 4 is not optically specified. Thus, only from view points of the durability, mass producibility, and recording characteristics, the film thickness of the dielectric film 4 can be optimized.

It is not necessary to structure the dielectric film 4 as a single layer. For example, as $SiN/SiO_2$ or $ZnS-SiO_2/SiN$, the dielectric film 4 may be composed of two or more layers. In this case, the same effect as example 6 can be obtained.

Next, examples 7 to 14 corresponding to the second embodiment of the present invention will be described in the following order.

(2-1) Consideration of Si composition of metal film
(2-2) Consideration of film thicknesses of first and second dielectric films
(2-3) Consideration of number of layers of dielectric film
(2-4) Consideration of light absorption coefficient of oxide film
(2-5) Consideration of film thicknesses of metal film and oxide film
(2-6) Consideration of oxygen concentration of metal film
(2-7) Consideration of groove depth and wobble amplification These examples were BD (Blu-ray Disc) write-once type optical recording mediums 10 and the oxygen concentration of the metal film 2 was 21 atomic %.

Their optical system was an optical disc recoding and reproducing apparatus that uses a two-group objective lens system having a numerical aperture of 0.85 and a blue-purple semiconductor laser light source having a wavelength of 405 nm.

As an evaluation unit, a Pulstec BD disc test unit ODU-1000 was used. A light source having a wavelength of 405.2 nm was used.

The C/N ratio of a reproduction signal was measured by a Germany Rohde-Schwartz spectrum analyzer FSP3.

In addition, jitter was measured by a time interval analyzer (Manufacturer: Yokokawa Electric Corporation; Model name: TA720) through an equalizer board (Manufacturer: Pulstec Industrial Co., Ltd.).

The amplitude, modulation degree, and so forth were measured by a digital oscilloscope (Manufacturer: Tektronix, Inc.; Model name: TDS7104).

The recording linear velocity was 9.83 m/s (double speed recording). The reproducing linear velocity was 4.92 m/s (single speed). The channel bit length was 74.50 nm (recording density: 25 GB, 12-cm optical disc).

The modulation system was 17 PP. The mark length of 2 T mark as the shortest mark was 0.149 μm. The mark length of 8 T mark was 0.596 μm. The track pitch was 0.32 μm.

(2-1) Consideration of Si Composition of Metal Film

The composition of the Ti film 2 was changed and the results were considered.

EXAMPLE 7

Figure 12:
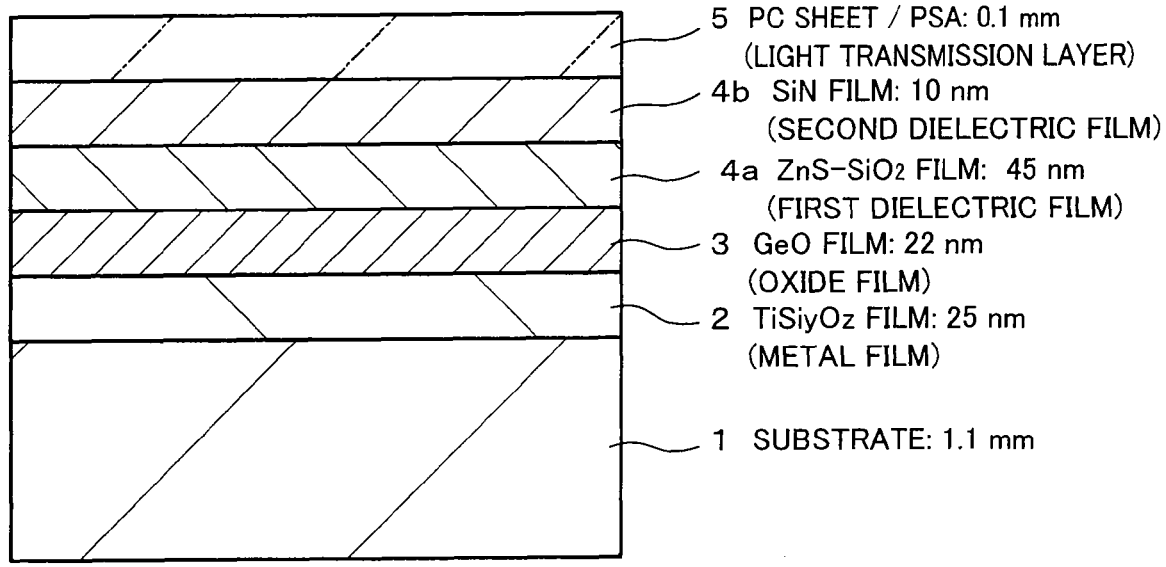
FIG. 12 is a schematic sectional view showing the structure of a write-once type optical recording medium according to example 7.

FIG. 12 is a schematic sectional view showing the structure of a write-once type optical recording medium 10 according to example 7.

First, a PC substrate 1 having a thickness of 1.1 mm was molded by the injection molding method. An uneven surface 11 having in-grooves 11G and on-grooves 11L (not shown) was formed on the PC substrate 1. The depth of the in-grooves 11G was 21 nm and the track pitch was 0.32 μm.

Next, with a film forming unit (Manufacturer: Unaxis Corp; Product name: Sprinter), a TiSiO film 2 having a film thickness of 25 nm, a GeO film 3 having a film thickness of 22 nm, a $ZnS-SiO_2$ film 4a having a film thickness of 45 nm, and a SiN film 4b having a film thickness of 10 nm were successively formed on the substrate 1. Thereafter, a polycarbonate sheet was adhered to the uneven surface 11 side of the substrate 1 by a pressure sensitive adhesive (PSA) such that a light transmission layer 5 was formed on the SiN film 4b. The film thickness of the light transmission layer 5 was 100 μm including the thicknesses of the PSA and the polycarbonate sheet. As a result, a desired write-once type optical recording medium 10 was fabricated.

The film forming steps were performed as follows.

After a vacuum chamber was vacuumed, while Ar gas and oxygen gas were being supplied to the vacuum chamber, TiSi target was spattered such that the TiSiO film 2 having a film thickness of 25 nm was formed on the substrate 1. The composition ratio of Si in the TiSi target was 20 atomic % and the oxygen composition of the TiSiO film 2 was 21 atomic %.

The film forming conditions in this film forming step were, for example, as follows:
Achieved degree of vacuum: $5.0 \times 10^{-5}$ Pa
Atmosphere: 0.2 Pa
Input power: 3 kW
Ar gas flow rate: 30 sccm
Oxygen gas flow rate: 5 sccm Next, the vacuum chamber was vacuumed. While Ar gas and $O_2$ gas were being supplied to the vacuum chamber, Ge target was reactively spattered such that the GeO film 3 having a film thickness of 22 nm was formed on the TiSi film 2. The oxygen composition of the GeO film 3 was specified such that the absorption coefficient k became 0.4.

The film forming conditions in this film forming step were, for example, as follows:
Achieved degree of vacuum: $5.0 \times 10^{-5}$ Pa
Atmosphere: 0.2 Pa
Input power: 2 kW
Ar gas flow rate: 30 sccm
Oxygen gas flow rate: 46 sccm Next, the vacuum chamber was vacuumed. While process gas was being supplied to the vacuum chamber, $ZnS-SiO_2$ target was spattered such that the $ZnS-SiO_2$ film 4a having a film thickness of 45 nm was formed on the GeO film 3. The composition ratio (atomic ratio) of the $ZnS-SiO_2$ film 4a was $ZnS:SiO_2=80:20$.

The film forming conditions in this film forming step were, for example, as follows:
Achieved degree of vacuum: $5.0 \times 10^{-5}$ Pa
Atmosphere: 0.1 Pa
Input power: 1 kW
Ar gas flow rate: 6 sccm Next, the vacuum chamber was vacuumed. While Ar gas and $N_2$ process gas were being supplied to the vacuum chamber, Si target was spattered such that the $Si_3N_4$ film 4b having a film thickness of 10 nm was formed on the substrate 1.

The film forming conditions in this film forming step were, for example, as follows:

Achieved degree of vacuum: $5.0\times10^{-5}$ Pa
Atmosphere: 0.3 Pa
Input power: 4 kW
Ar gas flow rate: 50 sccm
$N_2$ gas flow rate: 37 sccm Next, a plurality of write-once type optical recording mediums 1010 were fabricated in the same manner as the foregoing write-once type optical recording mediums 10 except that the composition of the TiSiO film 2 was changed.

Next, the jitters and powers Pw (recording sensitivities) of the plurality of write-once type optical recording mediums 10 fabricated in the foregoing manner were measured.

Figure 13:
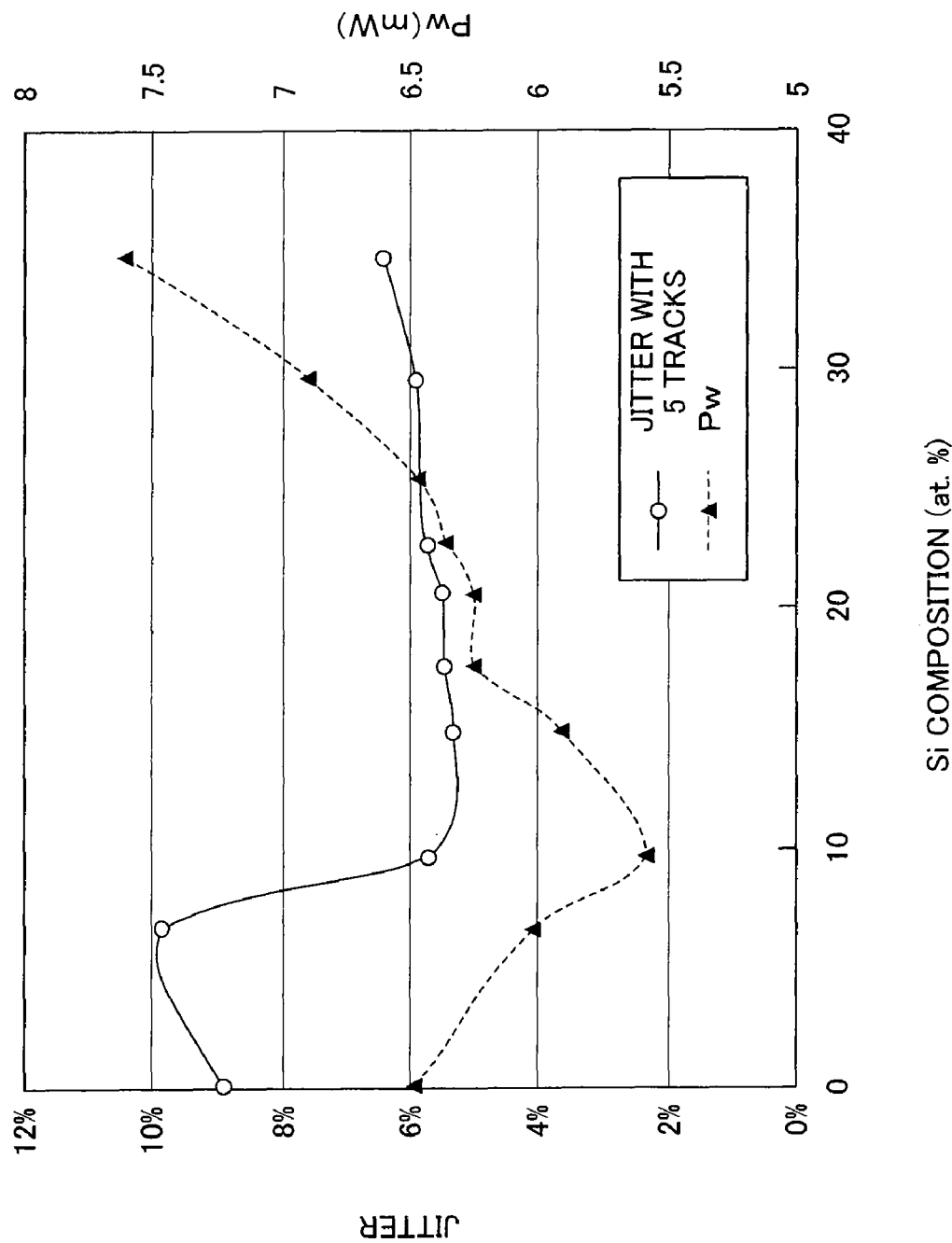
FIG. 13 is a graph showing the relationship of Si composition of a metal film, jitter, and power Pw.

FIG. 13 is a graph showing the relationship of the Si composition of the TiSiO film, jitter, and power Pw. Although the BD standard for write-once type optical recording mediums (BD-R) 10 requires that jitter of double-speed recording and recording density of 25 GB be 6.5% or less and that the recording sensitivity be 7.0 mW, FIG. 13 shows that the write-once type optical recording medium 10 according to example 7 satisfies the DB standard when the composition of the TiSiO film 2 is properly selected.

Specifically, it is found that to satisfy the BD standard for jitter, the Si composition of TiSi be 8 atomic % or more and that to satisfy the BD standard for recording sensitivity, the Si composition of TiSi be 32 atomic % or less. In other words, when the Si composition is in the range from 8 atomic % to 32 atomic %, it is found that a BD-R disc having excellent characteristics can be fabricated.

In the foregoing structure, the SiN film 4b made of $Si_3N_4$ is disposed as a separation layer that prevents the ZnS—SiO2 film 4a from deteriorating due to reaction with the PSA of the light transmission layer 5. Thus, it is preferred that the film thickness of the SiN film 4b be as thin as possible as long as it has a function of a separation layer. Although detail description is omitted, it was confirmed that even if the film thickness of the SiN film 4b is decreased to 4 nm, the recording sensitivity and jitter do not change and the durability does not deteriorate.

When the SiN film 4b is not likely to react with the foregoing PSA, for example, the light transmission layer 5 is made of UV resin instead of the PSA, or when the write-once type optical recording medium 10 is used for a short time, the second dielectric film 4b can be omitted.

(2-2) Consideration of Film Thicknesses of First and Second Dielectric Films

Next, the film thicknesses of the first dielectric film 4a and the second dielectric film 4b were changed and the results were considered.

EXAMPLE 8

A plurality of write-once type optical recording mediums 10 were fabricated in the same manner as in example 7 except that the film thickness T1 of the ZnS—$SiO_2$ film 4a was changed in the range from 10 nm to 43 nm and that the film thickness T2 of the SiN film 4b was changed in the range from 0 to 35 nm.

Comparison 2

A write-once type optical recording medium 10 was fabricated in the same manner as in example 7 except that the ZnS—$SiO_2$ film 4a was not formed (film thickness T1=0) and that the film thickness of the SiN film 4b was 60 nm.

Next, leading jitters and trailing jitters of recording marks of example 8 and comparison 3 that were fabricated in the foregoing manners were measured.

FIG. 14 shows measurement results of the leading jitters and trailing jitters of the recording marks. FIG. 14 shows that when the film thickness of the ZnS—$SiO_2$ film 4a is in the range from 10 nm to 43 nm and the film thickness of the SiN film 4b is in the range from 0 to 35 nm, the leading jitter and trailing jitter of a recording mark become 6.5% or less.

FIG. 14 shows that since jitter is 6.5% or less in a very wide range of the film thickness of the ZnS—$SiO_2$ film 4a, recording can be satisfactorily performed and in particular when the film thickness of the ZnS—$SiO_2$ film 4a is 23 nm or more, the recording characteristics are stable. Thus, the film thickness of the ZnS—$SiO_2$ film 4a is preferably 10 nm or more, further more preferably 23 nm or more. Since the total film thickness of the ZnS—$SiO_2$ film 4a and the SiN film 4b shown in FIG. 14 is around 50 nm, the upper limit of the film thickness of the ZnS—SiO2 film 4a is not specified. The upper limit of the film thickness of the ZnS—$SiO_2$ film 4a depends on the reflectance ratio. In other words, when the film thickness of the ZnS—$SiO_2$ film 4a is very large, since the reflectance ratio lowers, the upper limit of the film thickness of the ZnS—$SiO_2$ film 4a is given. The standard for the BD-R single-layer mediums requires that the reflectance ratio thereof be 12% or more. In this example 7, when the film thickness of the SiN film was 4 nm and the film thickness of the ZnS—$SiO_2$ film 4a was just 58 nm, the reflectance ratio of the write-once type optical recording medium 10 became 12%. Thus, when the film thickness of the ZnS—$SiO_2$ film 4a was 58 nm or more, the reflectance ratio did not satisfy the standard for the BD-R. Consequently, the upper limit of the film thickness of the ZnS—$SiO_2$ film 4a is preferably 58 nm or less. However, if a standard that requires a loose restriction for the reflectance ratio of optical discs is established, when such a standard is applied or since the BD-R standard for dual layer discs requires that the reflectance ratio be 4% or more, even if the film thickness of the ZnS—$SiO_2$ film is more than 58 nm, the effect of the recording characteristics of the present invention is not impaired, but valid.

Thus, since the film thickness of the ZnS—$SiO_2$ film 4a can be selected in such a wide range, the film thickness of the ZnS—SiO2 film 4a can be optimally selected taking into account of the reflectance ratio.

On the other hand, when only the SiN film 4b is formed without the ZnS—SiO2 film 4a, since jitter decreases by 0.5%, the range in which the standard requires that jitter be 6.5% or less becomes narrow. In other words, as long as the film thickness of the ZnS—SiO2 film 4a is in a regular range, to improve recoding and reproducing characteristics, it is effective to use ZnS—$SiO_2$ as the dielectric film 4.

(2-3) Consideration of Number of Layers of Dielectric Film

Next, the number of layers of the dielectric film 4 was changed and the results were considered.

EXAMPLE 9

Figure 15:
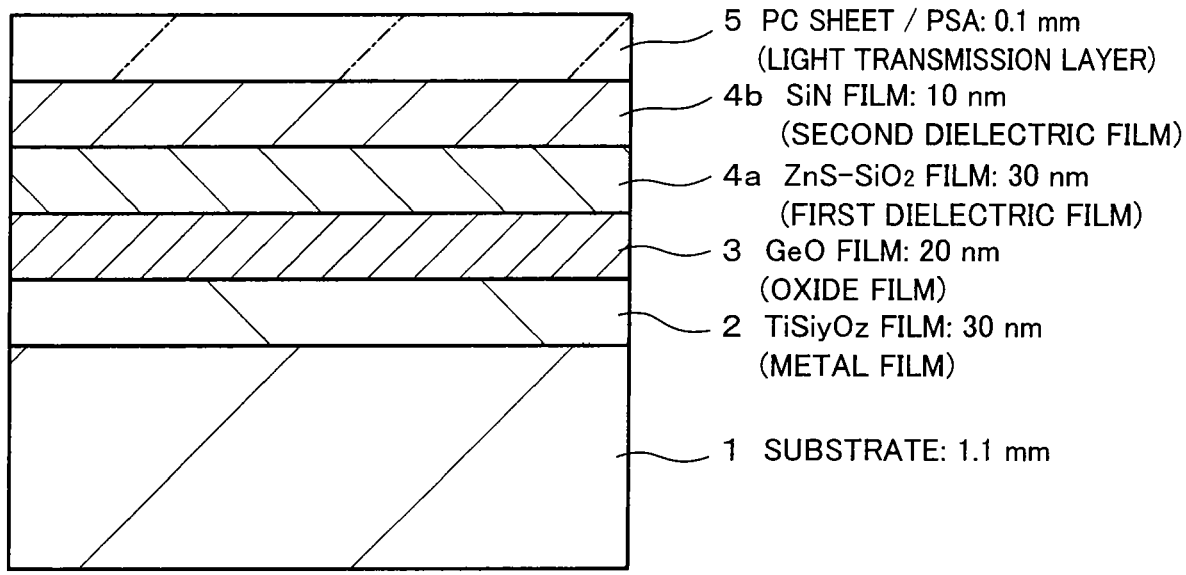
FIG. 15 is a schematic sectional view showing the structure of a write-once type optical recording medium according to example 9.

FIG. 15 is a schematic sectional view showing the structure of a write-once type optical recording medium according to example 9.

A write-once type optical recording medium 10 was fabricated in the same manner as in example 7 except that the content of Si in the TiSiO film 2 was 10 atomic %, the film thickness of the TiSiO film 2 was 30 nm, the film thickness of the GeO film 3 was 20 nm, and the film thickness of the ZnS—$SiO_2$ film 4a was 30 nm.

EXAMPLE 10

Figure 16:
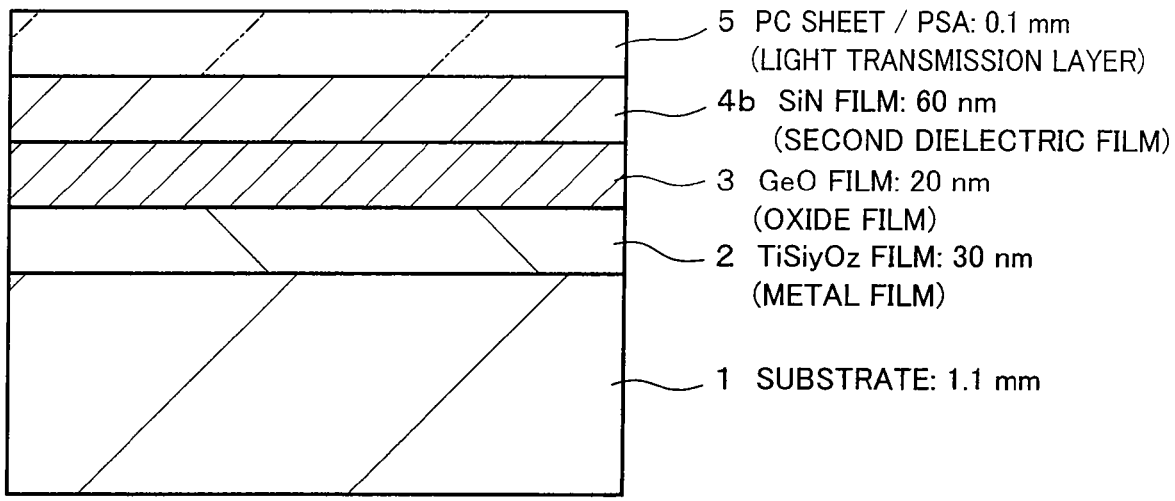
FIG. 16 is a schematic sectional view showing the structure of a write-once type optical recording medium according to example 10.

FIG. 16 is a schematic sectional view showing the structure of a write-once type optical recording medium according to example 10.

A write-once type optical recording medium 10 according to example 10 was fabricated in the same manner as in example 7 except that the ZnS—SiO2 film 4a was omitted and only the SiN film 4b having a film thickness of 60 nm was formed as a dielectric film.

The foregoing examples 9 and 10 were designed such that the reflectance ratio was around 15% and the light absorption amount of the GeO film 3 became the nearly same as that of the TiSiO film 2.

After the recording powers Pw of the write-once type optical recording mediums 10 according to examples 9 and 10 were changed and information signals were recorded, their C/N ratio and modulation degree were measured.

Figure 17:
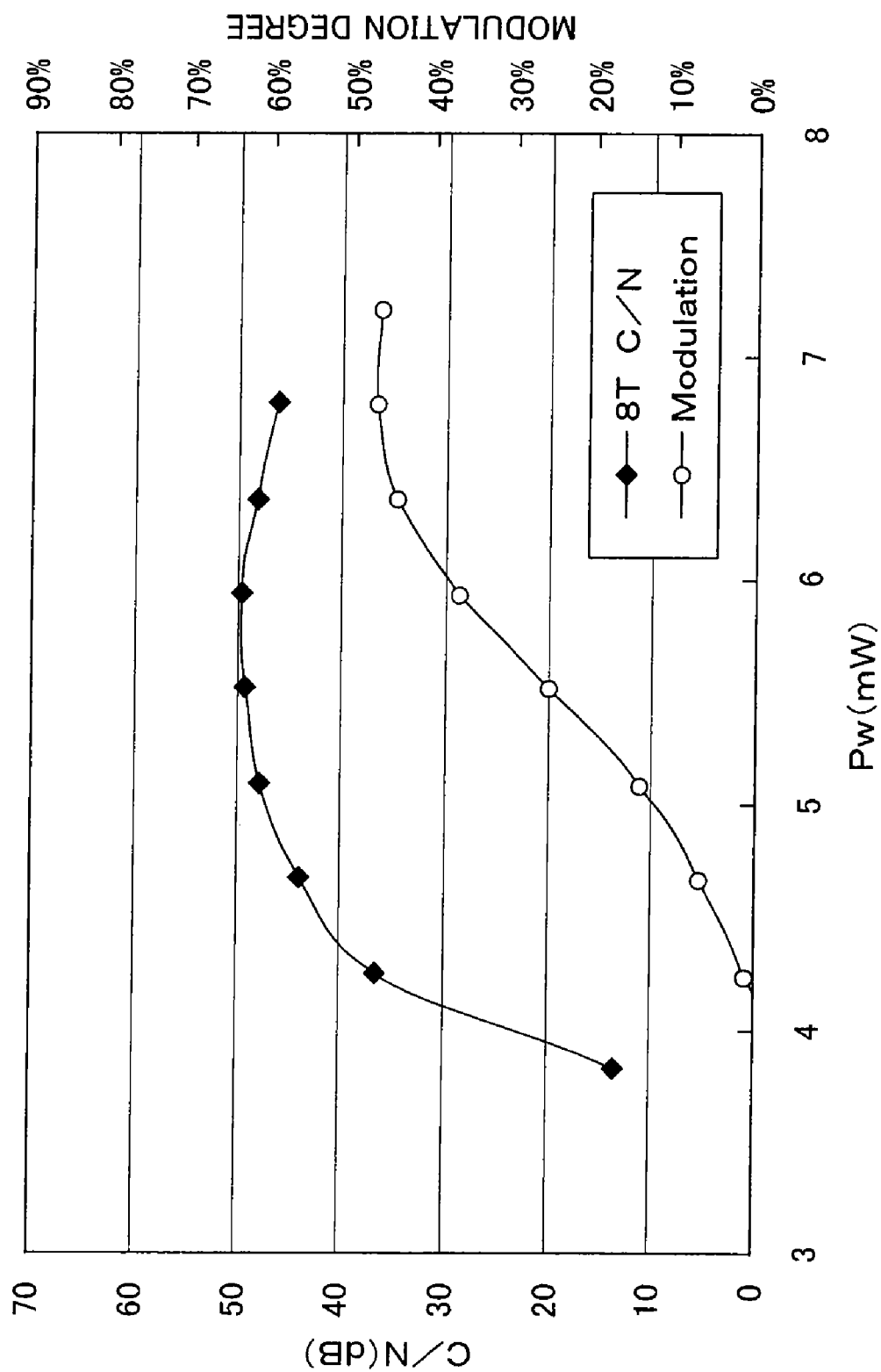
FIG. 17 is a graph showing measured results of dependencies of C/N ratio and modulation degree against recording sensitivity (recording power Pw) of a write-once type optical recording medium according to example 9.
Figure 18:
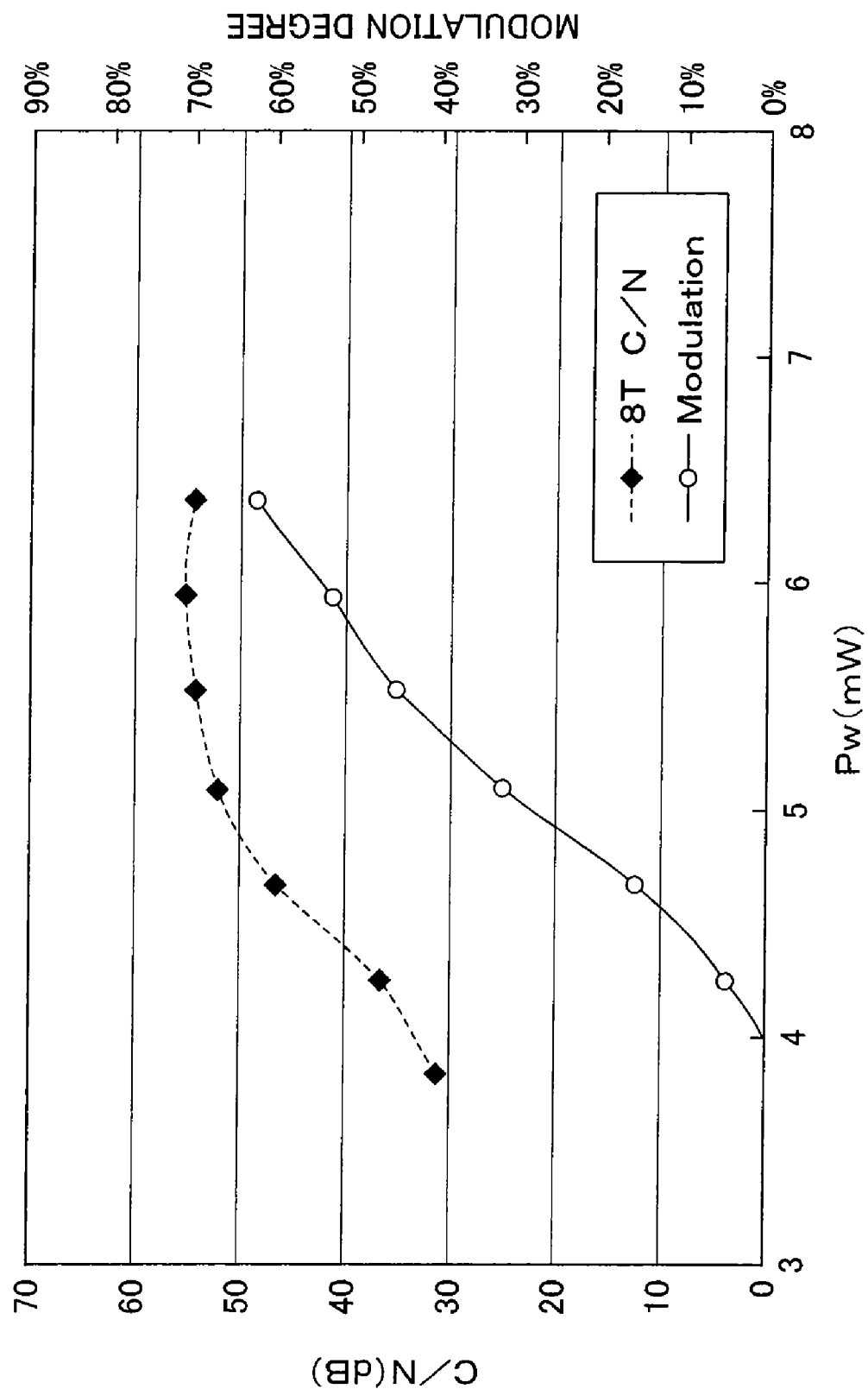
FIG. 18 is a graph showing measured results of dependencies of C/N ratio and modulation degree against recording sensitivity (recording power Pw) of a write-once type optical recording medium according to example.

FIG. 17 and FIG. 18 show the relationship of the recording sensitivity (recording power Pw), C/N ratio, and modulation degree of each of the write-once type optical recording mediums 10 according to examples 9 and 10.

FIG. 17 and FIG. 18 show that the modulation degree and the C/N ratio of a write-once type optical recording medium 10 of which both the ZnS—SiO$_2$ film 4a and the SiN film 4b are formed are larger than those of a write-once type optical recording medium 10 of which only the SiN film 4b is formed.

Examples of other additives that improve durability and recording characteristics for TiSi of the metal film 2 include Cu, Pd, Ni, C, Cr, Fe, Mg, V, Ca, B, Nb, Zr, S, Se, Mn, Ga, Mo, Tb, Dy, and Nd.

(2-4) Consideration of Light Absorption Coefficient of Oxide Film

The absorption coefficient of the oxide film 3 was changed and the results were considered.

EXAMPLE 11

A plurality of write-once type optical recording mediums 10 were fabricated in the same manner as in example 7 except that the oxygen concentration of the GeO film 3 was changed.

Next, the light absorption coefficient and jitter of each of the write-once type optical recording mediums 10 fabricated in the foregoing manner were measured. When jitter was measured, as described above, the recording liner velocity was 2×(9.83 m/s).

Figure 19:
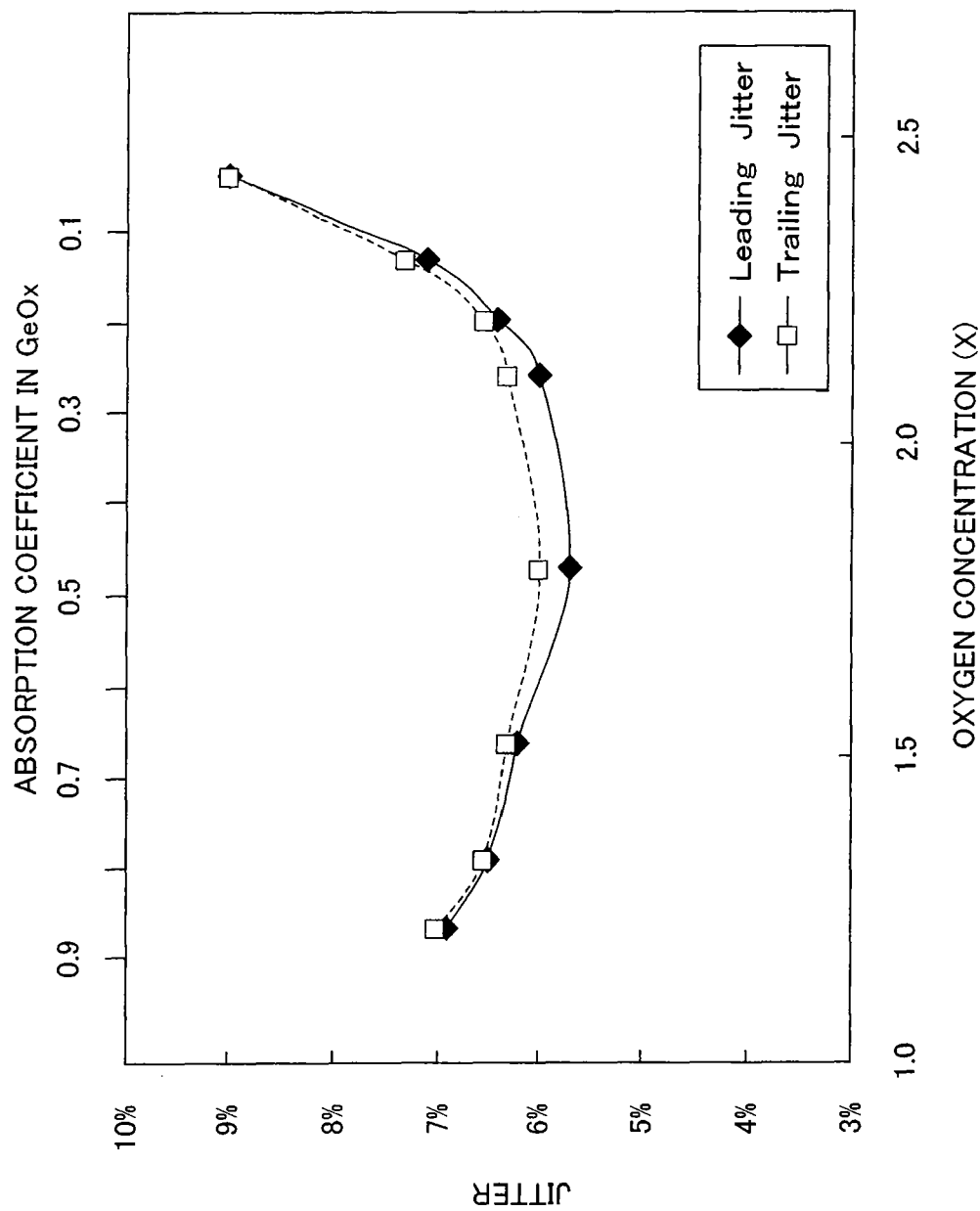
FIG. 19 is a graph showing variation of jitter against oxygen concentration and absorption coefficient.

FIG. 19 shows the variation of jitter with oxygen concentration and absorption coefficient. FIG. 19 shows that there are optimum ranges of oxygen concentration and absorption coefficient of the GeO film. FIG. 19 shows that it is preferred that the absorption coefficient k be in the range of $0.15 \leq k \leq 0.90$ to satisfy the BD-R standard requiring that jitter be 6.5% or less. Thus, when the oxygen concentration of the GeO film 3 is adjusted such that the absorption coefficient k of the GeO film 3 is in the range of $0.15 \leq k \leq 0.90$, a write-once type optical recording medium 10 having excellent characteristics can be fabricated.

(2-5) Consideration of Film Thicknesses of Metal Film and Oxide Film

Next, the film thicknesses of the metal film 2 and the oxide film 3 were changed and the results were considered.

EXAMPLE 12

FIG. 20 shows the measured results of the film thicknesses of the TiSiO film 2 and the GeO film 3 and the jitter values. A plurality of write-once type optical recording mediums 10 were fabricated in the same manner as in example 7 except that the film thicknesses of the TiSiO film 2 and the GeO film 3 were changed as shown in FIG. 20.

Next, information signals were recorded to the write-once type optical recording mediums 10 fabricated in the foregoing manner by the evaluation unit. Thereafter, the leading jitters and trailing jitters of recording marks were measured. Since the thermal characteristics of the recording films vary with the film thicknesses, resulting in a change of the shape (width, timing, and power) of optimum record pulses, the shapes of the record pulses were optimized for the individual write-once type optical recording mediums 10 and only the most excellent jitters were considered. FIG. 20 shows the most excellent jitters.

FIG. 20 shows the following result.

When the film thickness of the metal film 2 is in the range from 20 nm to 27 nm or the film thickness of the oxide film 3 is in the range from 16 nm to 22.5 nm, jitter becomes much less than 6.5%, which is the value specified in the BD-R standard. In other words, the margins of the film thicknesses can become very large. When the absorption coefficient of the oxide film is low, even if the film thickness thereof exceeds such a range, the same effect can be obtained. When the film thickness of the oxide film is 35 nm or less, an excellent result can be obtained as in example 5.

(2-6) Consideration of Oxygen Concentration of Metal Film

Next, the oxygen concentration of the metal film 2 was changed and the results were considered.

EXAMPLE 13

While Ar gas and oxygen gas were being supplied to the vacuum chamber, TiSi alloy target was reactively spattered such that the TiSiO film 2 was formed on the substrate 1. The Si composition of TiSi alloy of the TiSiO film 2 was 20 atomic %. The flow rate of oxygen gas supplied to the vacuum chamber was adjusted for each sample such that the oxygen concentration of the TiSiO film 2 was changed. Thereafter, the GeO film 3 having absorption coefficient k=0.4 was formed on the TiSiO film 2. Except for these steps, a plurality of write-once type optical recording mediums 10 were fabricated in the same manner as in example 1.

Next, information signals were recorded to the write-once type optical recording mediums 10 fabricated in the foregoing manner by a BD evaluation unit (Manufacturer: PULSTEC Industrial Co., Ltd; Model name: ODU-1000 (BD specification)). Thereafter, jitter values were measured by the BD evaluation unit. The wavelength of the light source was 405.2 nm and the numerical aperture N. A. of the objective lens was 0.85.

The recording density was 25 GB (12-cm disc) and the recording linear velocity was 9.83 m/s equivalent to the standard for double speed recording.

In this recording density, when a jitter level of a recording medium is 6.5% or less through a limit equalizer, it can be used as a judgment index denoting that the recording medium has excellent characteristics.

Figure 21:
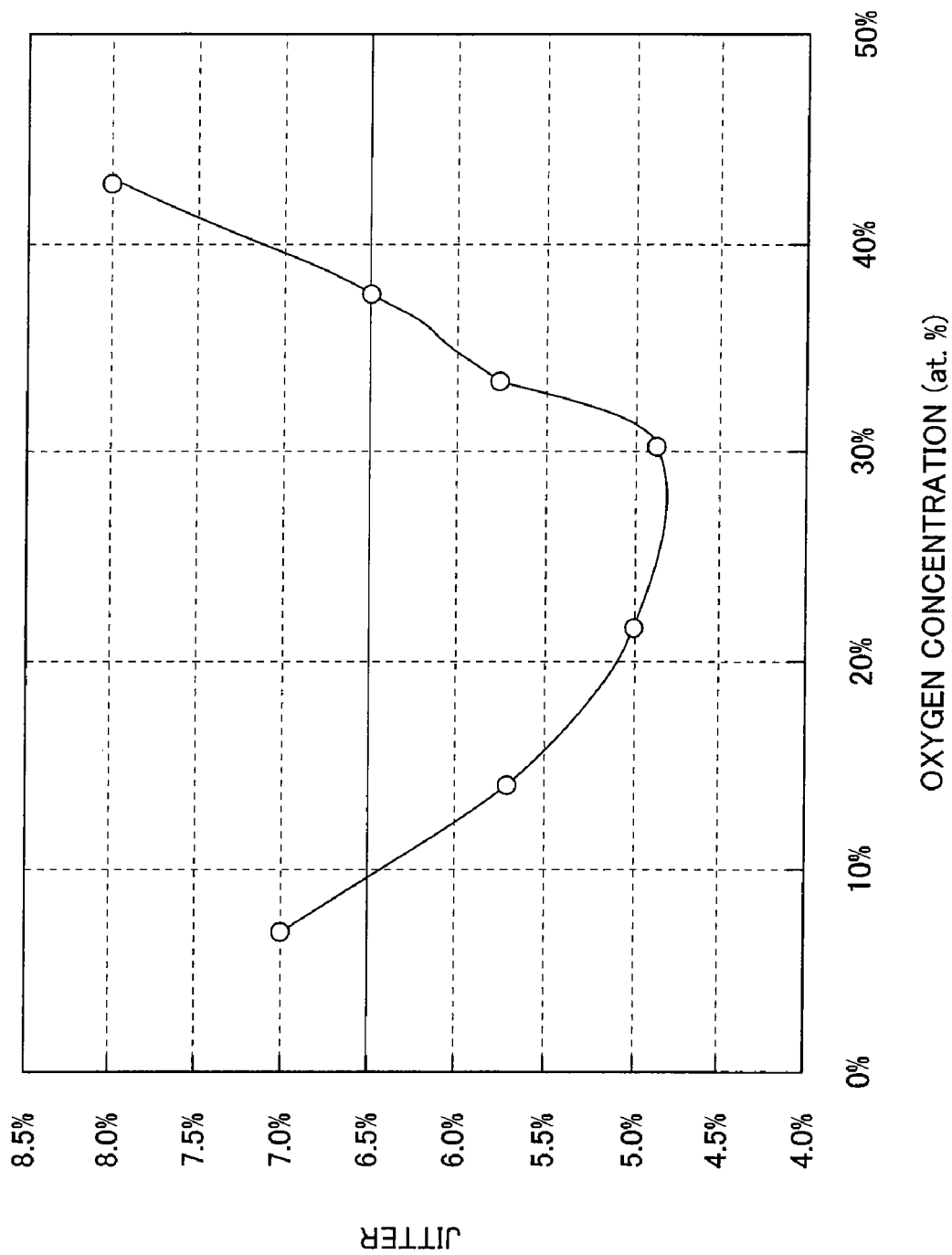
FIG. 21 is a graph showing the relationship of oxygen concentration of a metal film and jitter characteristic.

A graph shown in FIG. 21 was plotted based on the measured jitter and oxygen concentration of each of the write-once type optical recording mediums 10.

FIG. 21 is a graph showing the relationship of the oxygen concentration and jitter characteristics of the metal film. FIG. 21 shows that when the metal film 2 is made of an oxide of TiSi, jitter can be improved. It can be thought that the improvement of jitter is due to a decrease of noise component and an increase of reactivity of the GeO film 3. When the oxygen concentration is very high, jitter deteriorates. It can be thought that the deterioration of jitter is due to a decrease of the absorption coefficient of TiSi and the sensitivity gradually deteriorates, resulting in a non-ideal temperature distribution upon recording.

Thus, when oxygen is contained in the metal film 2, the characteristics of the write-once type optical recording medium 10 can be effectively improved. In addition, there is an optimum range of the oxygen concentration. When the oxygen concentration is in the range from for example 9 atomic % to 38 atomic %, jitter can become 6.5% or lower, which satisfies the value specified in the BD standard.

In this case, the composition ratio of Si to Ti is preferably in the range from 8 atomic % to 32 atomic %.

(2-7) Consideration of Groove Depth and Wobble Amplitude

Next, a plurality of write-once type optical recording mediums 10 having different groove depths were fabricated and they were considered.

EXAMPLE 14

Figure 22:
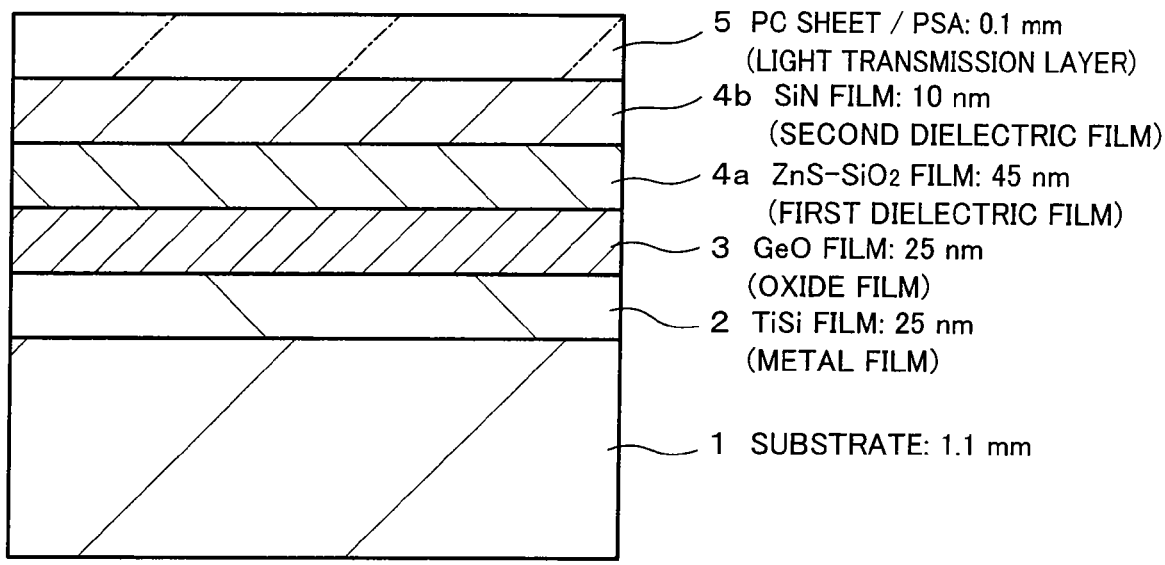
FIG. 22 is a schematic sectional view showing the structure of a write-once type optical recording medium according to example 14.

FIG. 22 is a schematic sectional view showing the structure of a write-once type optical recording medium according to example 14. A plurality of substrates having in-grooves 11G and on-grooves 11L formed on one principal surface were molded by the injection molding method such that the depth of the in-grooves 11G was changed. As a resin material, polycarbonate resin was used. The pitch of the in-grooves and on-grooves, namely the track pitch, was 0.32 μm (BD specification).

Next, with the film forming unit (Manufacturer: Unaxis AG; Product name: Sprinter), a TiSiO film 2, a GeO film 3, a ZnS—SiO$_2$ film 4a, and a SiN film 4b were successively formed on a substrate 1. The film thickness of the TiSiO film 2 was 25 nm, the film thickness of the GeO film 3 was 25 nm, the film thickness of the ZnS—SiO$_2$ film was 45 nm, and the film thickness of the SiN film 4b was 10 nm. The Si composition of TiSi was 27 atomic %.

Thereafter, a polycarbonate sheet was adhered to an uneven surface 11 of the substrate 1 by a pressure sensitive adhesive (PSA) such that a light transmission layer 5 was formed on the SiN film 4b. The film thickness of the light transmission layer 5 was 100 μm including the thicknesses of the PSA and the polycarbonate sheet. A plurality of desired write-once type optical recording mediums 10 were fabricated in the foregoing manner.

Next, jitter values of the write-once type optical recording mediums 10 fabricated in the foregoing manner were evaluated by an evaluation unit (Manufacturer: PULSTEC Industrial Co., Ltd; Model name: ODU-1000 (BD specification)). The wavelength of the light source of the evaluation device was 405 nm and the N. A. of the objective lens thereof was 0.85.

Information signals were recorded and reproduced with a density of 25 GB at a single speed (4.92 m/s). In addition, information signals were successively recorded and 10 tracks were reproduced such that crosstalk occurred.

Figure 23:
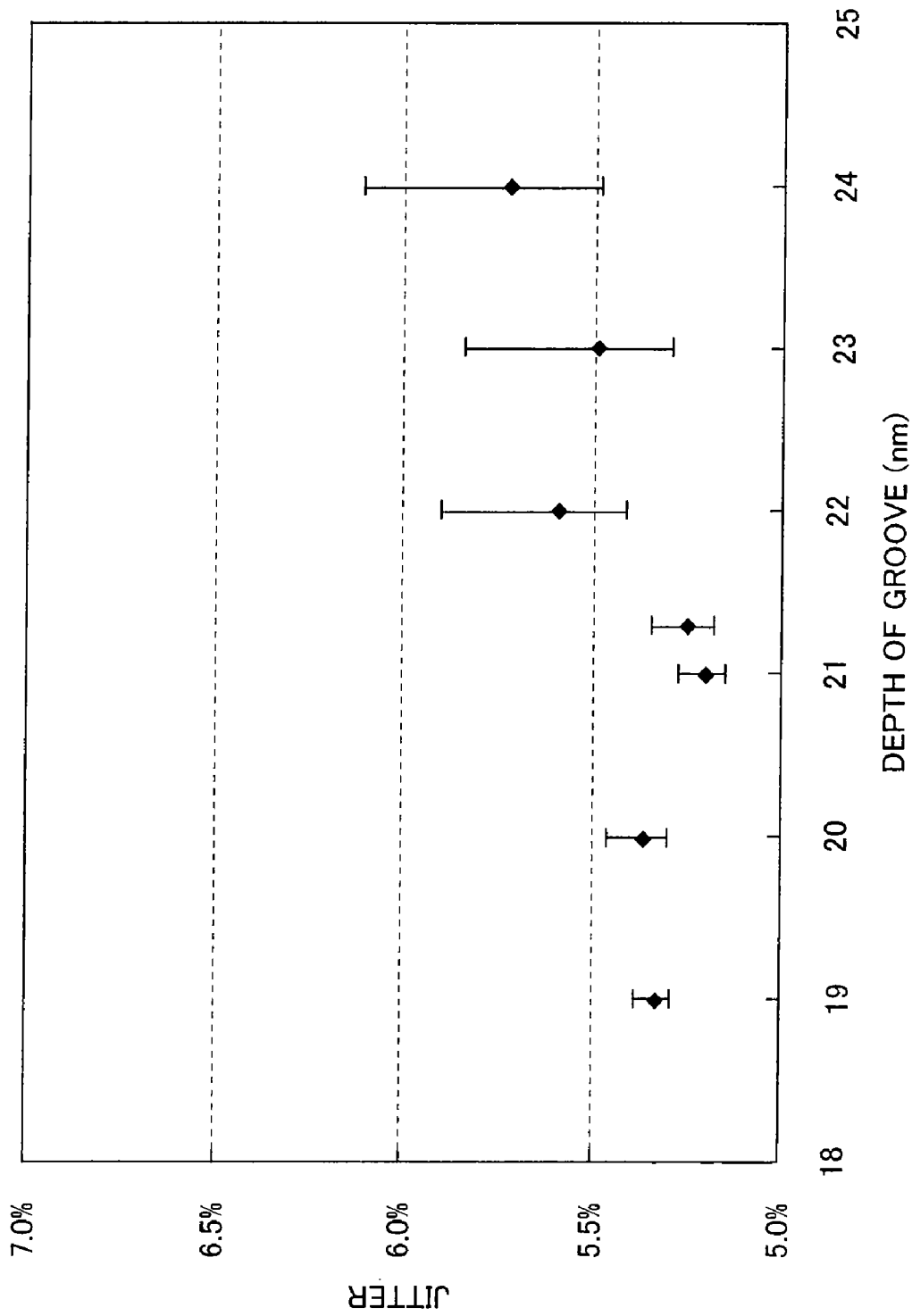
FIG. 23 is a graph showing the relationship of groove depth and jitter of the write-once type optical recording medium according to example 14.

Thereafter, a graph shown in FIG. 23 was plotted based on the measured jitter values. FIG. 23 is a graph showing the relationship of the depth of in-grooves and jitter. In FIG. 23, a point near the center of each error bar represents the average value of jitter and the upper end and lower end of each error bar represent the range of fluctuation of jitter.

FIG. 23 shows that when the depth of a groove is 22 nm or more, jitter largely deviates in each track and the average jitter value slightly deteriorates. In contrast, when the depth of a groove is 21.5 nm or less, jitter less deviates and the average jitter value becomes excellent, resulting in obtaining excellent recording characteristics.

Figure 24:
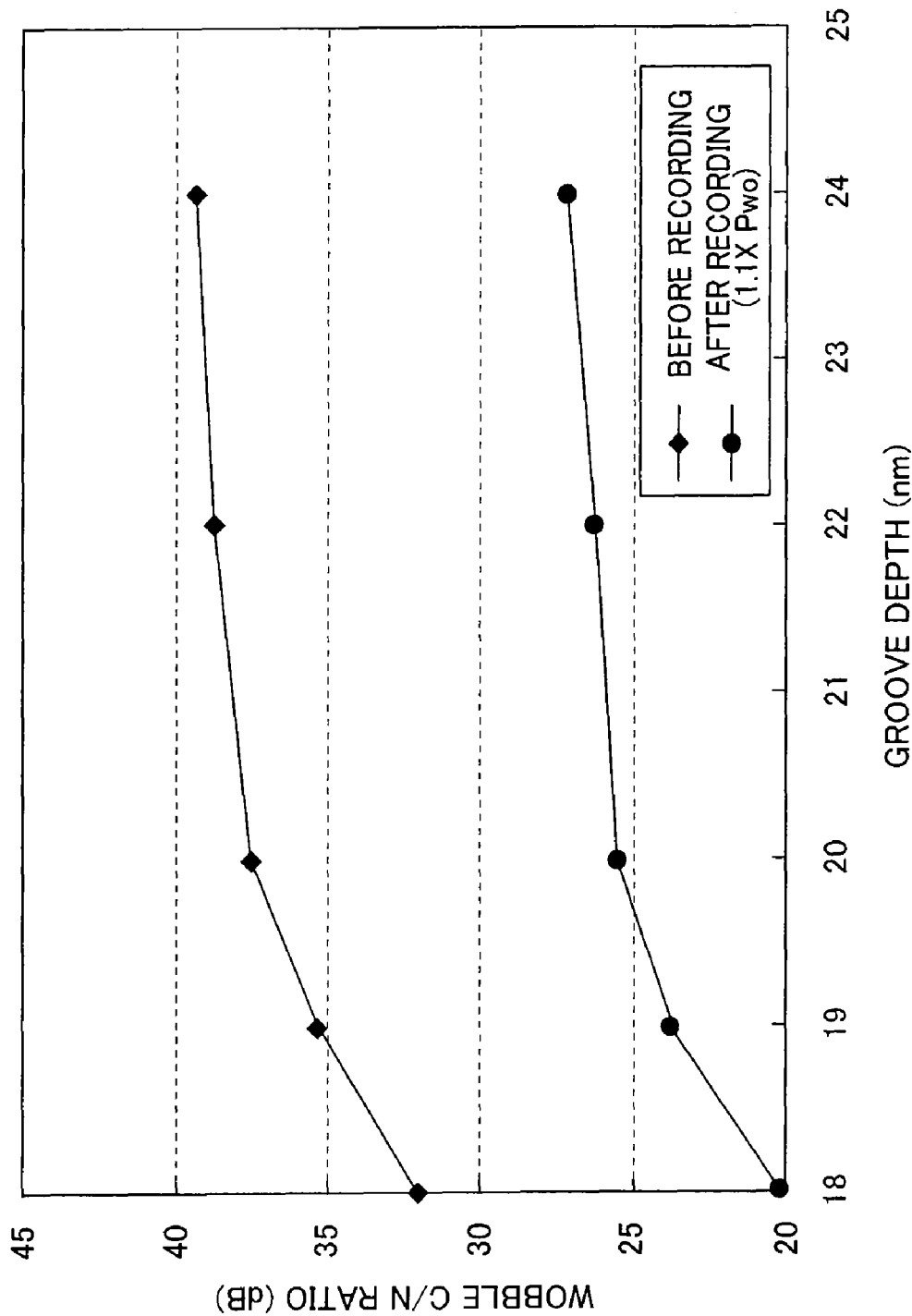
FIG. 24 is a graph showing the relationship of wobble C/N ratio and groove depth of the write-once type optical recording medium according to example 14.

Next, the wobble C/N ratio of each of the write-once type optical recording mediums 10 fabricated in the foregoing manner was measured. A graph shown in FIG. 24 was plotted based on the measured C/N ratio values. FIG. 24 is the graph showing the relationship of wobble C/N ratio and groove depth.

FIG. 24 shows that although characteristics gradually vary with the depth of grooves, when the depth of grooves is 19 nm or less, the C/N ratio gradually decreases. The blu-ray disc standard for the C/N ratio requires that the C/N ratio be 26 dB or more after recording with an optimum power. In the write-once type optical recording mediums 10 according to example 14, after recording with a power higher than the optimum power by 10%, they nearly satisfy 26 dB. However, when the depth of grooves is as small as 18 nm, the C/N ratio lowers to around 20 dB, which is much less than the value specified in the standard. Thus, address information is likely not to be read. Consequently, it is preferred that the depth of grooves be 18 nm or more.

Next, a CTS was changed and the relationship of the wobble amplitude and wobble C/N ratio of each of the write-once type optical recording mediums 10 that had fabricated in the foregoing manner and that had a groove depth of 20 nm was evaluated. Information signals were recorded and reproduced to and from on-grooves (lands) 11L by the blu-ray evaluation unit.

The CTS is defined by the following formula.

$$CTS=2(R_{ON}-R_{IN})/(R_{ON}+R_{IN})$$

where $R_{ON}$ is the return light amount to the blu-ray evaluation unit when tracking is performed for an on-groove (land), and $R_{IN}$ is the return light amount to the blu-ray evaluation unit when tracking is performed for an in-groove (groove).

Figure 25:
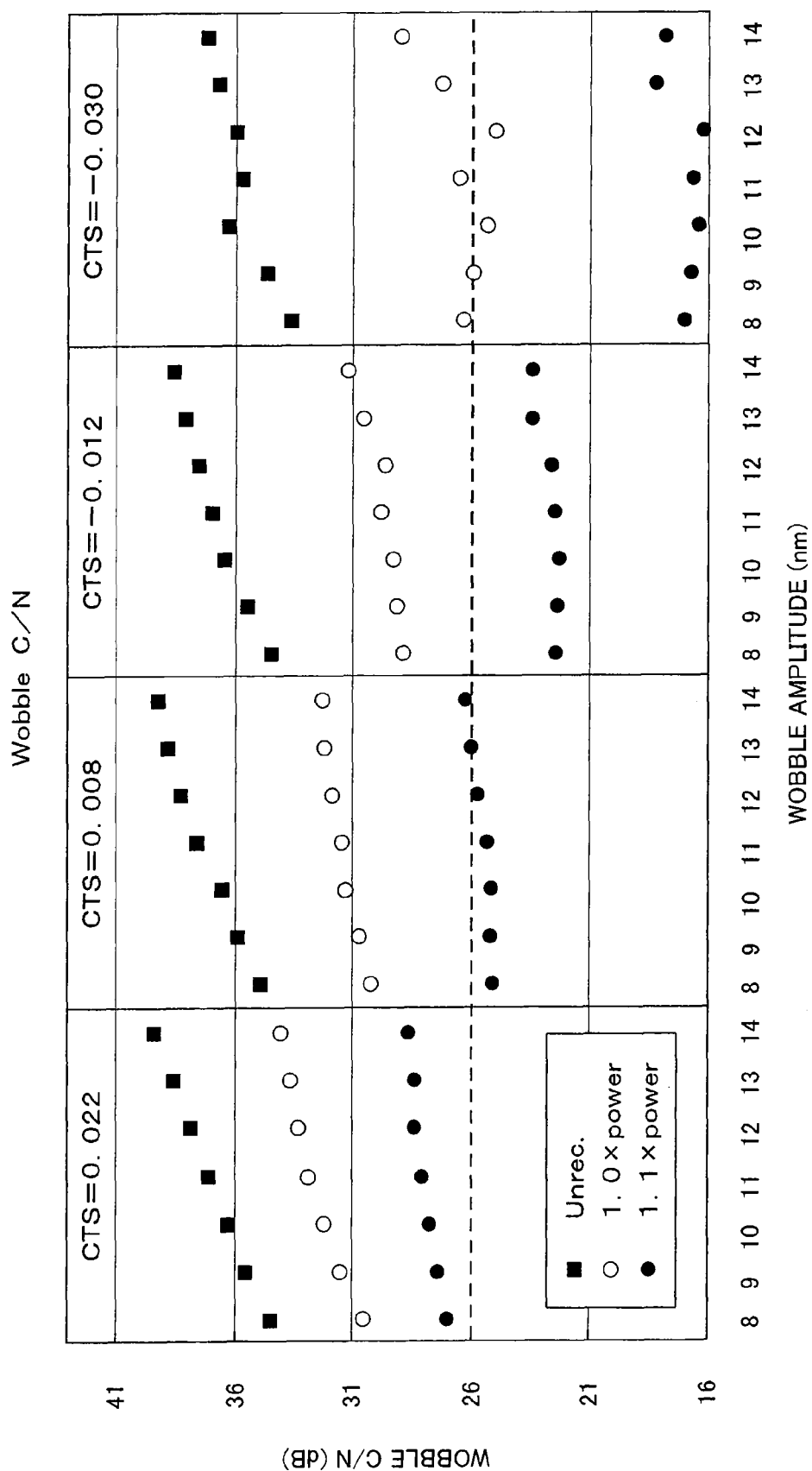
FIG. 25 is a graph showing the relationship of wobble amplitude and wobble C/N ratio when a CTS is changed.

FIG. 25 shows the relationship of wobble amplitude and wobble C/N ratio when the CTS is changed.

The CTS represents a parameter of the width of grooves. The CTS increases with the width of record grooves. FIG. 25 shows 26 dB that is the value specified in the blu-ray disc standard with a dashed line. To increase the system durability, it is preferred that the wobble amplitude be sufficiently larger than 26 dB represented by the dashed line.

FIG. 25 shows that when the CTS is small, such as −0.012 and −0.03, and recording is performed with a high power (1.1×Pwo), the C/N ratio is less than the value specified in the standard. Before recording is performed, the wobble C/N ratio does not nearly vary with the CTS (see "black squares" in FIG. 25). When recording is performed with a high power and a recording mark spreads in the groove width direction, the wobble C/N ratio largely varies with the CTS (see "black circles" in FIG. 25).

Focusing on the measured results with the optimum power (1.0× power) (see "white circles" in FIG. 25), when the CTS is −0.03 or more, it is found that the wobble C/N ratio satisfies the range specified in the standard. Focusing on the measured results with 1.1× power (see "black circles" in FIG. 25, it is found that when the CTS is −0.01, the wobble C/N ratio satisfies the range specified in the standard. When an OPC (Optimal Power Control) is performed, it is recommended that the recording sensitivity be evaluated with a tolerance of ±10%. Thus, even if information signals are recorded with the 1.1× power, it is recommended that the wobble C/N ratio be 26 dB or more, which is the value specified in the standard. Thus, the value of the CTS is preferably −0.03 or more, further preferably −0.01 or more.

This situation does not occur in blu-ray rewritable mediums. When recording is performed for a rewritable medium with a high power, a horizontally spread mark is erased and re-recorded when the adjacent track is recorded. In write-once type optical recording mediums typified by the present invention, once a mark is recorded, since it is not erased, this feature is an excellent advantage against rewritable mediums of related art. The present invention clearly presents this advantage. After recording is performed with a high power, the wobble C/N ratio does not largely vary with the wobble amplitude. The wobble C/N ratio has an important parameter optimized by the CTS.

Next, the CTS was changed and the relationship of the wobble amplitude and an NWS (Normalized Wobble Signal) of the foregoing write-once type optical recording mediums 10 was evaluated.

The NWS is defined by the following formula.

NWS=$Iwpp/Ipp$ where Iwpp is the amplitude of a push-pull signal that occurs when tracking is performed, and Ipp is the amplitude of a push-pull signal that occurs when a guide groove is traversed without tracking.

Figure 26:
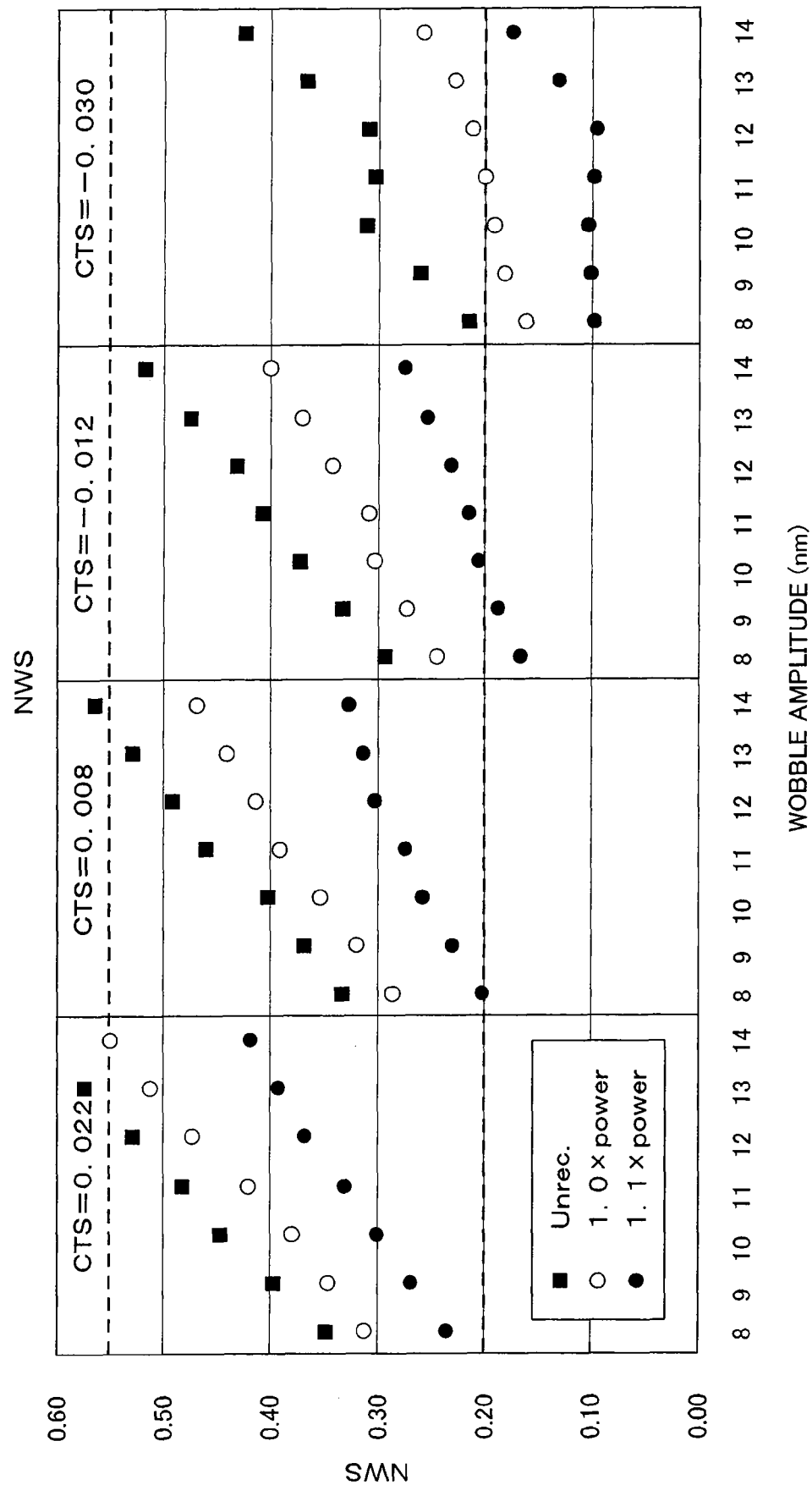
FIG. 26 is a graph showing the relationship of wobble amplitude and NWS value when the CTS is changed.

FIG. 26 shows the relationship of the wobble amplitude and NWS (Normalized Wobble Signal) value when the CTS is changed. The blu-ray disc standard requires that the NWS be in the range from 0.20 to 0.55. FIG. 26 shows this range with a dashed line. It is preferred that after recording is performed with a high power, the NWS be in the range from 0.20 to 0.55 as represented by the dashed line.

FIG. 26 shows that the NWS increases with the CTS and the wobble amplitude. In FIG. 26, there are points that do not satisfy the value specified in the standard. The NWS more largely depends on the wobble amplitude than on the CTS. In addition, since the minimum value and the maximum value are set to the NWS, the wobble amplitude has a range for excellent values. When the CTS is increased with the wobble C/N ratio, it is preferred that the wobble amplitude be in the range from 9 nm to 12 nm. When the CTS is around −0.01, it is preferred that the wobble amplitude be in the range from 11 nm to 13 nm.

Taking into account of these factors, it is preferred that the wobble amplitude be in the range from 9 nm to 13 nm.

Next, examples 15 to 16 corresponding to the third embodiment of the present invention will be described.

(3) Consideration of Forming BCA with Blue-color Laser

A method of forming a BCA with a blue-color laser was considered. Next, the considered results will be described.

EXAMPLE 15

A write-once type optical recording medium 10 according to example 15 has the structure of which a TiSi film 2, a GeO film 3, a ZnS—SiO$_2$ film 4a, a SiN film 4b, and a light transmission layer 5 have been successively formed on a substrate 1.

Next, a method of fabricating the write-once type optical recording medium 10 according to example 15 will be described. First, the substrate 1 having in-grooves 11G and on-grooves 11L formed on one principal surface was molded by the injection molding method. As a resin material, polycarbonate resin was used. The track pitch was 0.32 μm, the depth of the in-grooves 11G was 21 nm, and the on-grooves 11L were wobbled to add address information.

Next, the vacuum chamber was vacuumed. While Ar gas was being supplied to the vacuum chamber, TiSi target was spattered such that the TiSi film 2 having a film thickness of 27 nm was formed on the substrate 1. The composition ratio of Si in the TiSi film 2 was 27 atomic %.

The film forming conditions in this film forming step were, for example, as follows.
Achieved degree of vacuum: $5.0\times10^{-5}$ Pa
Atmosphere: 0.2 Pa
Input power: 3 kW
Ar gas flow rate: 30 sccm Next, the vacuum chamber was vacuumed. While Ar gas was being supplied to the vacuum chamber, Ge oxide target was spattered such that the GeO film 3 having a film thickness of 26 nm was formed on the TiSi film 2. The oxygen composition of the Ge oxide target was adjusted such that the absorption coefficient k of the GeO film 3 became 0.40.

The film forming conditions in this film forming step were, for example, as follows.
Achieved degree of vacuum: $5.0\times10^{-5}$ Pa
Atmosphere: 0.2 Pa
Input power: 2 kW
Ar gas flow rate: 30 sccm Next, the vacuum chamber was vacuumed. While Ar gas was being supplied to the vacuum chamber, ZnS—SiO$_2$ target was spattered such that the ZnS—SiO$_2$ film 4a having a film thickness of 45 nm was formed on the GeO film 3.

The film forming conditions in this film forming step were, for example, as follows.
Achieved degree of vacuum: $5.0\times10^{-5}$ Pa
Atmosphere: 0.1 Pa
Input power: 1 kW
Ar gas flow rate: 6 sccm Next the vacuum chamber was vacuumed. While Ar gas and N$_2$ gas were being supplied to the vacuum chamber, Si target was spattered such that the SiN film 4b having a film thickness of 7 nm was formed on the substrate 1.

The film forming conditions in this film forming step were, for example, as follows.
Achieved degree of vacuum: $5.0\times10^{-5}$ Pa
Atmosphere: 0.3 Pa
Input power: 4 kW
Ar gas flow rate: 50 sccm
N$_2$ gas flow rate: 37 sccm Next, a annular polycarbonate sheet was adhered to the substrate 1 by a pressure sensitive adhesive (PSA) applied on one principal surface of the sheet such that a light transmission layer 5 having a film thickness of 0.1 mm was formed.

Next, laser light having a wavelength of 405 nm was modulated in a pulse shape and radiated through the light transmission layer 5 side to the BCA. As a result, a write-once type optical recording medium 10 having the BCA in which bar code shape recording marks were formed was fabricated. The beam width was around 5 μm, the line velocity was 10 m/s, the laser radiation power was 160 mW, and the beam feed amount per rotation was 2 μm.

EXAMPLE 16

Next, a write-once type optical recording medium 10 having a bar code formed in the BCA was fabricated in the same manner as in example 15 except that recording marks were formed by radiation of laser light having a wavelength band of 800 nm.

Next, signals were reproduced from the BCAs of examples 15 to 16 fabricated in the foregoing manners and the reproduction signals were evaluated.

Figures 27A, 27B, 27C:
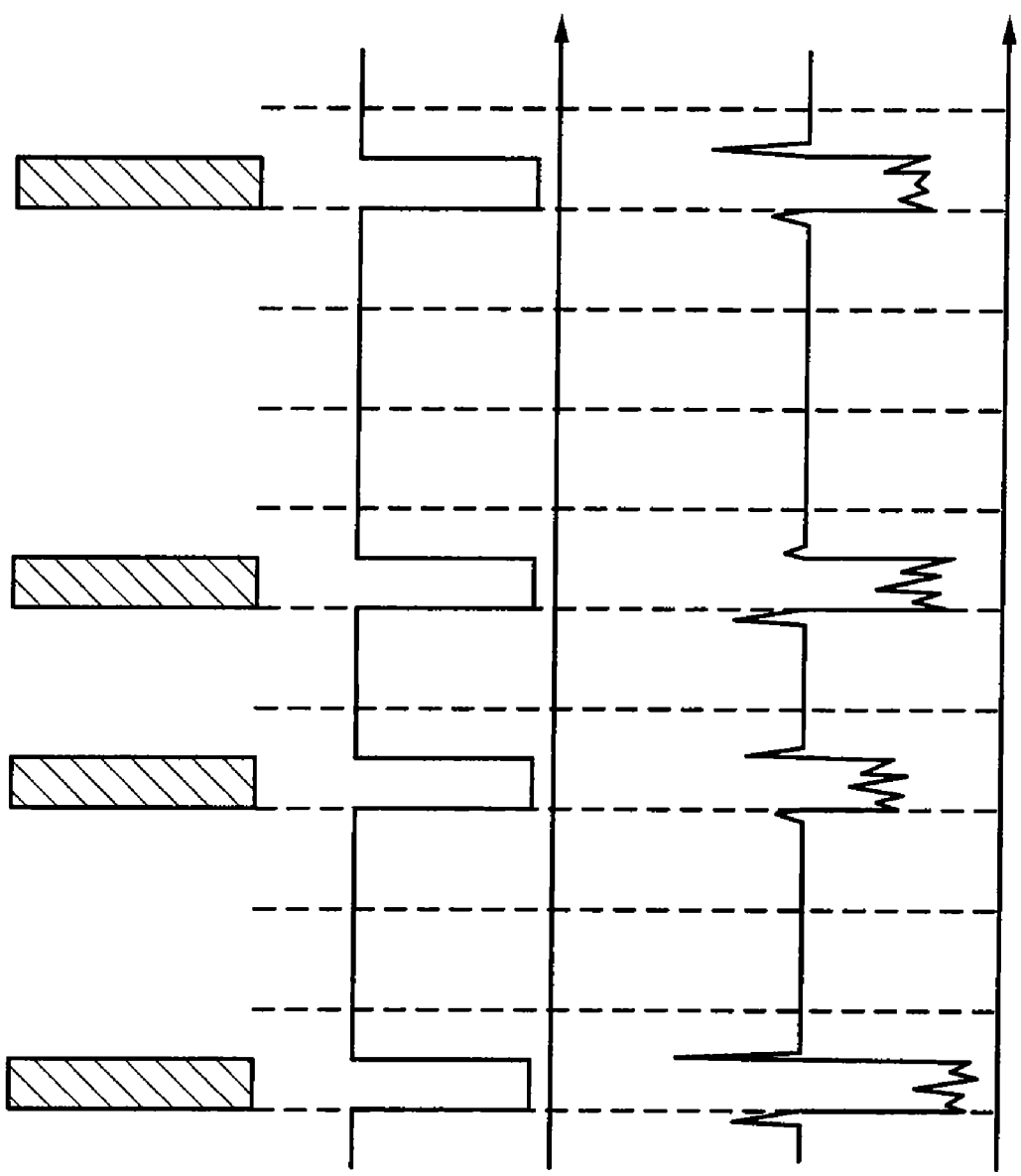
FIG. 27A is a schematic diagram showing an image of recording marks formed in the BCA.
FIG. 27B is a schematic diagram showing a waveform of a reproduction signal according to example 15.
FIG. 27C is a schematic diagram showing a waveform of a reproduction signal according to example 16.
Figure 32C:
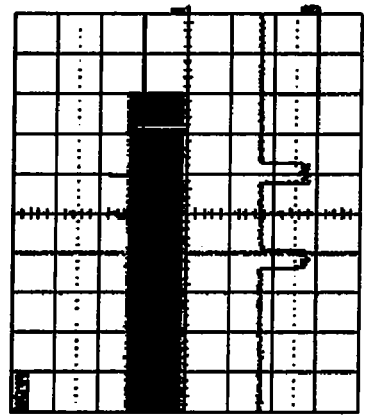
FIGS. 32A to 32E are schematic diagrams showing reproduction signals according to examples 17 to 21, respectively.
Figure 32B:
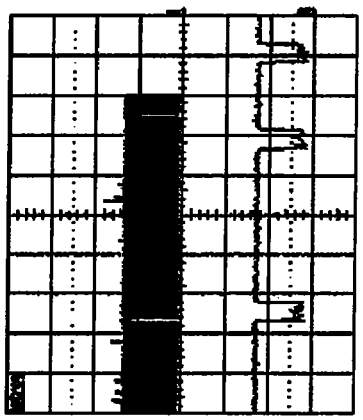
Figure 32E:
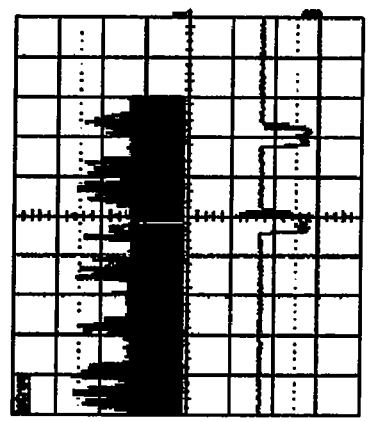
Figure 32A:
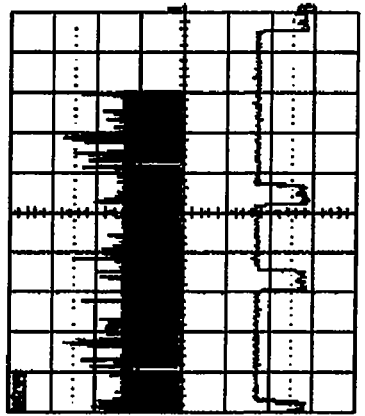
Figure 32D:
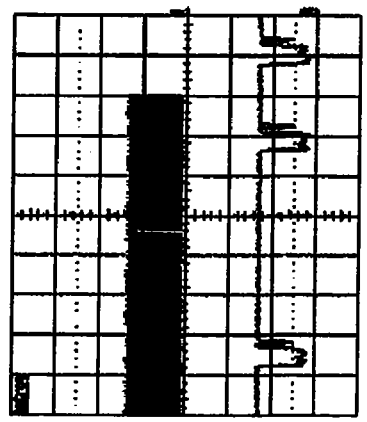
Figure 33C:
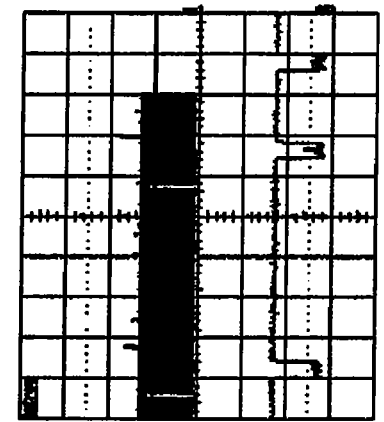
FIGS. 33A to 33E are schematic diagrams showing reproduction signals according to examples 22 to 26, respectively.
Figure 33B:
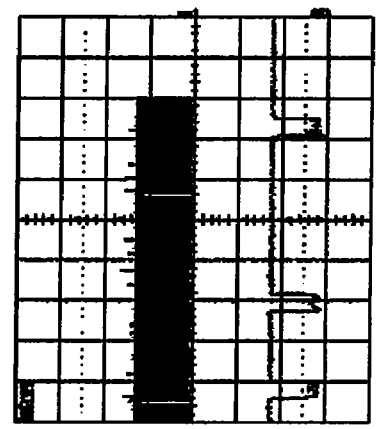
Figure 33E:
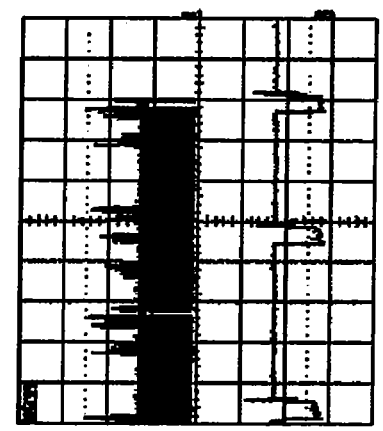
Figure 33A:
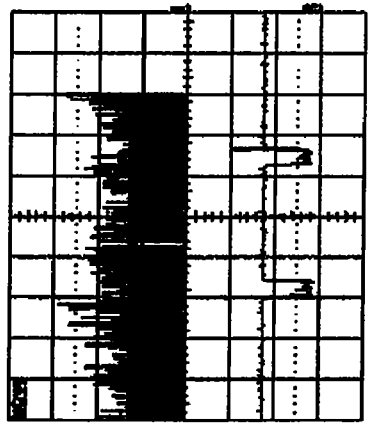
Figure 33D:
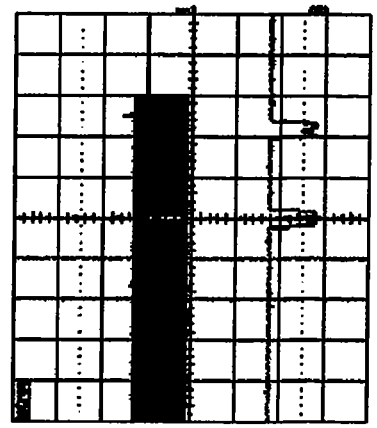
Figure 34C:
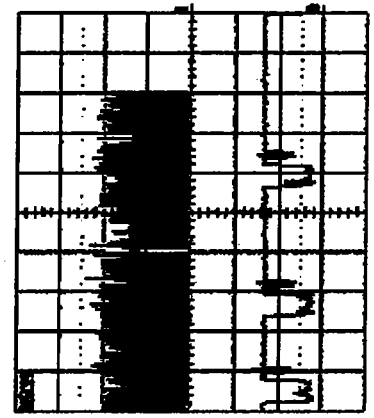
FIGS. 34A to 34E are schematic diagrams showing reproduction signals according to examples 27 to 31, respectively.
Figure 34B:
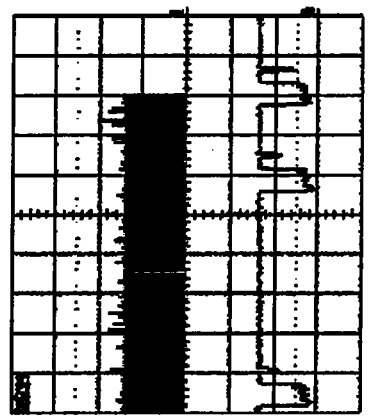
Figure 34E:
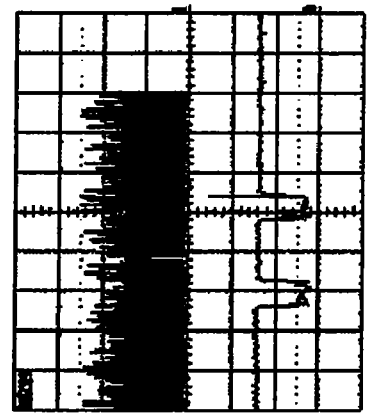
Figure 34A:
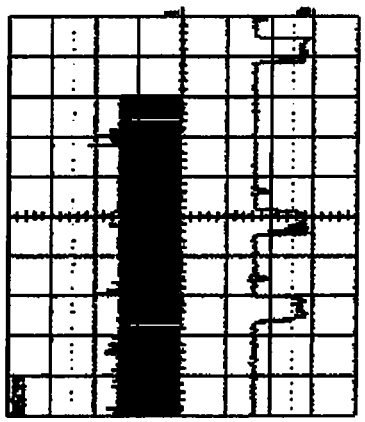
Figure 34D:
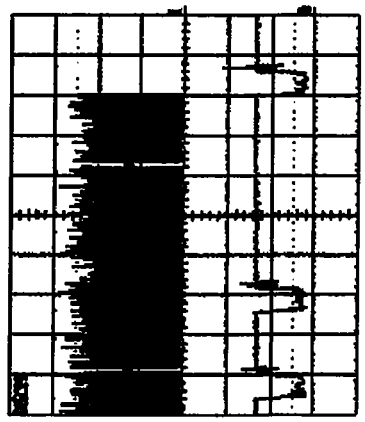
Figure 35C:
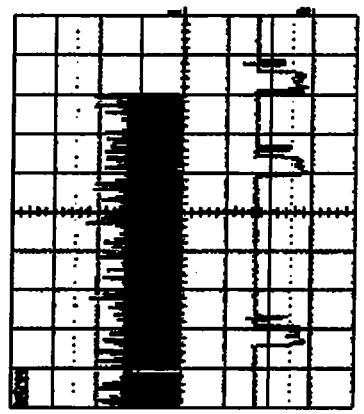
FIGS. 35A to 35E are schematic diagrams showing reproduction signals according to examples 32 to 36, respectively.
Figure 35B:
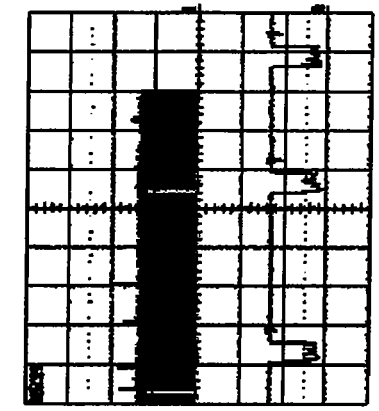
Figure 35E:
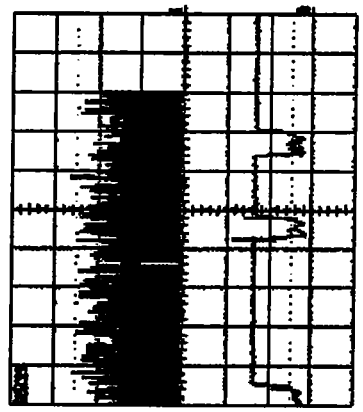
Figure 35A:
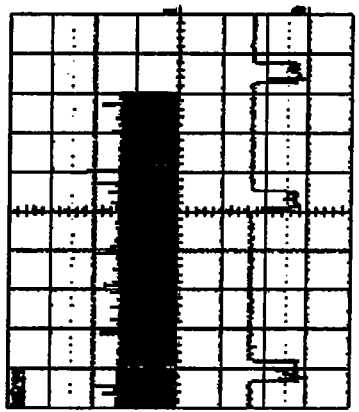
Figure 35D:
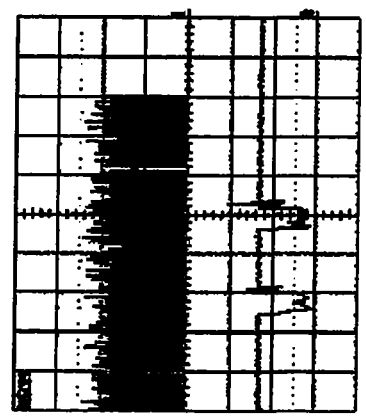

FIG. 27A shows an image of recording marks formed in a BCA. FIG. 27B shows a waveform of a reproduction signal of example 15. FIG. 27C shows a waveform of a reproduction signal of example 16. In FIG. 27B and FIG. 27C, weak noise is omitted to allow example 15 and example 16 to be easily compared.

When the waveforms shown in FIG. 27B and FIG. 27C are compared, it is found that in example 16 there is an area of which the reflectance ratio increases at a boundary portion of a recording mark, whereas in example 15 there is no area of which the reflectance ratio sharply increases at a boundary portion of a recording mark. It can be thought that since a 800 nm band laser has a wavelength dependency, it is difficult to record an information signal to the BCA of the write-once type optical recording medium 10 optimized for recording and reproducing in the 400 nm band. Although illustration is omitted, the signal level in the BCA of example 15 was relatively uniform.

Next, examples 17 to 36 corresponding to the fourth embodiment of the present invention will be described.

(4) Consideration of Method of Forming BCD with Infrared Laser

Next, a method of forming a BCD with an infrared laser was considered.

The contents of the consideration will be described.

EXAMPLES 17 TO 21

First, a plurality of write-once type optical recording mediums 10 were fabricated in the same manner as in the foregoing example 15. The scan speed of the optical head was changed in the range from 3 m/s to 11 m/s for each of the write-once type optical recording mediums 10 and laser light having an output power of 4000 mW and a wavelength of 810 nm was modulated in a pulse shape and radiated through the substrate 1 side to the BCA. As a result, the TiSi film 2, the GeO film 3, the ZnS—SiO$_2$ film 4a, and the SiN film 4b were melt-removed from each of the write-once type optical recording mediums 10. Consequently, a plurality of write-once type optical recording mediums 10 having bar code shape marks formed in the BCA were fabricated. The beam width was around 30 µm, the laser radiation power was 4000 mW, and the beam feed amount per rotation was 10 µm.

EXAMPLES 22 TO 26

A plurality of write-once type optical recording mediums 10 having bar code shape marks formed in the BCA were fabricated in the same manner as in examples 17 to 21 except that the output power was 3400 mW.

EXAMPLES 27 TO 31

A plurality of write-once type optical recording mediums 10 having bar code shape marks formed in the BCA were fabricated in the same manner as in examples 17 to 21 except that laser light was radiated through the light transparent layer side to the BCA.

EXAMPLES 32 TO 36

A plurality of write-once type optical recording mediums 10 having bar code shape marks formed in the BCA were fabricated in the same manner as in examples 22 to 26 except that laser light was radiated through the light transparent layer side to the BCA.

In the foregoing examples 17 to 36, from a view point of practical use, an infrared laser having a wavelength of 810 nm was used. However, the wavelength of the laser light may be properly selected. Thus, the wavelength of the infrared laser is not limited to 810 nm. For example, an infrared laser having a wavelength ranging from for example 720 to 2500 nm may be used. In the foregoing examples 17 to 36, the laser light having a wavelength of 810 nm was used due to the following specific reason. In other words, it is difficult to obtain a laser power that can destructively remove films formed on the substrate 1 with a laser that does not have a wavelength of around 810 nm. In other words, since laser powers of lasers having wavelength bands of 650 nm and 400 nm are not sufficient to destructively remove the films formed on the substrate 1.

Next, signals were reproduced from the BCAs of examples 17 to 36 and the reproduction signals were evaluated.

FIG. 28 shows the evaluation results of the reproduction signals from the BCAs of examples 17 to 21. FIG. 29 shows the evaluation results of the reproduction signals from the BCAs of examples 22 to 26. FIG. 30 shows the evaluation results of the reproduction signals from the BCAs of examples 27 to 31. FIG. 31 shows the evaluation results of the reproduction signals from the BCAs of examples 32 to 36. FIGS. 32A to 32E show the reproduction signals of examples 17 to 21, respectively. FIGS. 33A to 33E show the reproduction signals of examples 22 to 26, respectively. FIGS. 34A to 34E show the reproduction signals of examples 32 to 36, respectively. In the evaluation result fields of FIG. 28 to FIG. 31, "O" represents a reproduction signal of which the signal level in the BCA portion is relatively uniform and there is no area in which the reflectance ratio sharply increases in a boundary portion of a mark, whereas "X" represents a reproduction signal of which the signal level in the BCA portion is not uniform and there is an area in which the reflectance ratio sharply increases in a boundary portion of a mark. In each of FIG. 32A to FIG. 35E, a signal waveform shown at a lower portion is an enlarged view of a part of a signal waveform shown at an upper portion. A to E of FIG. 32A to FIG. 35E correspond to signal waveforms of the write-once type optical recording mediums 10 having the BCAs formed at scan speeds of 3 m/s to 11 m/s.

FIG. 28 to FIG. 31 show that when laser light is radiated through the light transmission layer 5 side, the signal level of the BCA portion is not uniform and there is an area in which the reflectance ratio sharply increases at a boundary portion of a mark regardless of the scan speed of the optical head and the laser power.

In contrast, it is found that when laser light is radiated through the substrate 1 side, the scan speed of the optical head is in the range from 5 m/s to 9 m/s, and the laser power is in the range from 3400 mW to 4000 mW, the signal level in the BCA portion is relatively uniform and there is no area in which the reflectance ratio sharply increases at a boundary portion of a mark.

As is clear from the foregoing description, according to the embodiments of the present invention, excellent write-once type optical recording mediums 10 having a film structure corresponding to the desired reflectance ratio, sensitivity, optical system, and so forth can be accomplished.

A write-once type optical recording medium 10 having excellent characteristics as BD-R for high density recording corresponding to the blu-ray standard using a short wavelength and a large numerical aperture can be fabricated.

The inorganic recording film 6 can be composed of three or four layers. As a result, the fabrication cost can be reduced.

As in the foregoing examples, when the light transmission layer 5 has the structure of a PSA/resin sheet, the light transmission layer 5 has excellent characteristics. As a result, a write-once type optical recording medium 10, for example BD-R, having stable storage property and durability can be fabricated.

As described above, in the structures of the embodiments of the present invention, write-once type optical recording mediums 10 having excellent recording characteristics and durability can be fabricated.

In addition, since excellent recording characteristics can be obtained with a very small number of layers, namely three layers of the metal film 2, the oxide film 3, and the dielectric film 4, the write-once type optical recording mediums 10 have high mass producibility. In addition, since the number of layers is small, the incidence of inferior products can be decreased, resulting in reducing the fabrication cost.

Thus, in the present invention, with the foregoing three layers, recording and reproducing can be satisfactorily performed. However, when the reflectance ratio and/or durability is increased depending on the mode for use and purpose, besides these three layers, a metal film and/or a dielectric film may be disposed.

The first to fourth embodiments of the present invention have been specifically described. However, the present invention is not limited to the foregoing first to fourth embodiments. It should be noted that various medications may be made based on the spirit of the present invention.

For example, the numeric values in the foregoing first to fourth embodiments are just examples. When necessary, different numeric values may be used.

In the foregoing first to fourth embodiments, the case of which by adhering the light transmission sheet to the substrate, the light transmission layer 5 is formed was described. Instead, the light transmission layer 5 may be made of ultraviolet setting resin. In this case, the light transmission layer 5 may be coated by for example the spin coat method.

In the foregoing first to fourth embodiments, the case of which the metal film 3 is made of Ti was described. Instead, it can be thought that when the metal film 3 is made of a metal material that has a light-catalyst effect other than Ti, a write-once type optical recording medium that can record an information signal can be fabricated as in the foregoing first to fourth embodiments.

The invention claimed is:

1. A write-once type optical recording medium having an inorganic recording film,
    wherein the inorganic recording film has:
    an oxide film made of an oxide of Ge; and
    an adjacent film disposed in contact with the oxide film and made of a metal material, and
    wherein an absorption coefficient k of the oxide film is in a range from $0.15 \leq k \leq 0.90$.

2. The write-once type optical recording medium as set forth in claim 1,
    wherein the oxide film has a film thickness ranging from 10 nm to 35 nm.

3. The write-once type optical recording medium as set forth in claim 1,
    wherein the adjacent film has been oxidized and a composition of oxygen of the adjacent film is in a range from 9 atomic % to 38 atomic %.

4. The write-once type optical recording medium as set forth in claim 1,
    wherein the adjacent film is made of Ti.

5. The write-once type optical recording medium as set forth in claim 4,
    wherein the adjacent film is made of a TiSi alloy containing Si.

6. The write-once type optical recording medium as set forth in claim 5,
    wherein a composition of Si of the TiSi alloy is in a range from 8 atomic % to 32 atomic %.

7. The write-once type optical recording medium as set forth in claim 1,
    wherein the adjacent film is made of Al.

8. The write-once type optical recording medium as set forth in claim 1,
    wherein the adjacent film is an alloy film made of Al and at least one of Tb, Gd, Dy, and Nd of rare earth metals.

9. The write-once type optical recording medium as set forth in claim 1,
    wherein a dielectric film is disposed on the oxide film such that the dielectric film and the adjacent film sandwich the oxide film.

10. The write-once type optical recording medium as set forth in claim 9,
    wherein the dielectric film is made of SiN.

11. The write-once type optical recording medium as set forth in claim 9,
    wherein the dielectric film is made of ZnS—$SiO_2$.

12. The write-once type optical recording medium as set forth in claim 9,
    wherein the dielectric film has:
    a first dielectric film disposed adjacent to the oxide film; and
    a second dielectric film formed on the first dielectric film, and
    wherein the first dielectric film is made of ZnS—$SiO_2$ and the second dielectric film is made of SiN.

13. The write-once type optical recording medium as set forth in claim 9,
    wherein the dielectric film has a film thickness ranging from 10 nm to 100 nm.

14. The write-once type optical recording medium as set forth in claim 1,
    wherein at least the oxide film and the adjacent film are formed on a substrate having an uneven surface of lands and grooves.

15. The write-once type optical recording medium as set forth in claim 1,
    wherein guide grooves are formed on a substrate at a track pitch ranging from 0.29 μm to 0.35 μm and the grooves have a depth ranging from 18 nm to 21.5 nm.

16. The write-once type optical recording medium as set forth in claim 15,
    wherein a relationship of $-0.01 < 2(R_{ON} - R_{IN})/(R_{ON} + R_{IN})$ is satisfied,
    where $R_{ON}$ is a return light amount from a recording/reproducing groove surface detected by a reproduction optical system and $R_{IN}$ is a return light amount from another groove surface detected by the reproduction optical system.

17. The write-once type optical recording medium as set forth in claim 15,
    wherein a wobble amplitude is in a range from 9 nm to 13 nm.

18. The write-once type optical recording medium as set forth in claim 1, further comprising:
    an identification information recording area in which identification information has been recorded,
    wherein the identification information has been recorded by forming a recording mark corresponding to the identification information on the oxide film.

19. The write-once type optical recording medium as set forth in claim 1, further comprising:
an identification information recording area in which identification information has been recorded,
wherein the identification information has been recorded by removing the inorganic recording film in a pattern corresponding to the identification information.

20. A method of fabricating a write-once type optical recording medium having an inorganic recording film, the method comprising the steps of:
forming an adjacent film made of Ti; and
forming an oxide film made of an oxide of Ge,
wherein the oxide film forming step and the adjacent film forming step are preformed such that the oxide film and the adjacent film are adjacent to each other, and
wherein an absorption coefficient k of the oxide film is in a range from $0.15 \leq k \leq 0.90$.

21. The method of fabricating the write-once type optical recording medium as set forth in claim 20, further comprising the step of:
recording identification information by radiating laser light having a wavelength ranging from 350 nm to 450 nm through the oxide film side to the write-once type optical recording medium.

22. The method of fabricating the write-once type optical recording medium as set forth in claim 20, further comprising the step of:
recording identification information by radiating laser light through the adjacent film side to the write-once type optical recording medium.

23. The method of fabricating the write-once type optical recording medium as set forth in claim 22,
wherein the laser light is radiated to the write-once type optical recording medium in conditions of which an optical head scan speed is in a range from 5 m/s to 9 m/s and a laser power is in a range from 3400 mW to 4000 mW.

* * * * *